United States Patent [19]
Lee et al.

[11] Patent Number: 5,903,536
[45] Date of Patent: May 11, 1999

[54] OBJECTIVE LENS DEVICE, OPTICAL PICKUP ADOPTING THE SAME AND METHOD FOR MANUFACTURING AN OBJECTIVE LENS

[75] Inventors: Chul-Woo Lee; Jang-Hoon Yoo, both of Seoul, Rep. of Korea

[73] Assignee: Samsung Electronics Co., Ltd., Suwon, Rep. of Korea

[21] Appl. No.: 08/800,395

[22] Filed: Feb. 14, 1997

[30] Foreign Application Priority Data

Feb. 14, 1996 [KR] Rep. of Korea ......................... 96-3604

[51] Int. Cl.⁶ ....................................................... G11B 7/00
[52] U.S. Cl. ................... 369/112; 369/44.12; 369/44.23; 369/93
[58] Field of Search ..................... 369/112, 110, 369/109, 103, 44.12, 44.14, 44.23, 44.25, 44.37, 93, 92

[56] References Cited

U.S. PATENT DOCUMENTS 4,668,056   5/1987   Braat et al. .............................. 350/432
5,349,592   9/1994   Andó ........................................ 372/32

FOREIGN PATENT DOCUMENTS

| 0 610 055 A2 | 8/1994 | European Pat. Off. |
| 7-98431 | 4/1995 | Japan . |
| 2 121 210 A | 12/1983 | United Kingdom . |
| 2 152 924 A | 8/1985 | United Kingdom . |
| WO 92/10769 A1 | 6/1992 | WIPO . |

*Primary Examiner*—Muhammad N. Edun
*Attorney, Agent, or Firm*—Staas & Halsey

[57] ABSTRACT

An objective lens for reproducing/recording information from/onto discs having different thicknesses and an optical pickup device adopting the same. The objective lens device includes an objective lens provided along a light path facing a plane of a disc and having a predetermined effective diameter, and a light controller provided along the light path for controlling the light of an incident light beam between near and far axes of the objective lens, wherein the central portion of the objective lens corresponding to the near-axis region of the incident light beam has the optimum curvature and aspherical coefficient for both thick and thin discs. Therefore, the objective lens device is simplified and inexpensive. Also, the objective lens device can be used for discs of different thicknesses in a single disc drive, by reducing the spherical aberration effect.

122 Claims, 25 Drawing Sheets

Sf > 1st REFERENCE SIGNAL

2nd REFERENCE < Sf < 1st REFERENCE SIGNAL VALUE

OBJECTIVE LENS DEVICE, OPTICAL PICKUP ADOPTING THE SAME AND METHOD FOR MANUFACTURING AN OBJECTIVE LENS

BACKGROUND OF THE INVENTION

The present invention relates to an objective lens device, an optical pickup adopting the same and a method for manufacturing an objective lens.

An optical pickup records and reproduces information such as video or audio data onto/from optical recording media, e.g., discs. The structure of a disc is such that a recorded surface is formed on a substrate made of plastic or glass. To read or write information from a high-density disc, the diameter of the optical spot must be very small. To this end, the numerical aperture (NA) of an objective lens is generally made large and a light source having a shorter wavelength is used. Using the shorter wavelength light source and large numerical aperture (NA), however, reduces a tilt allowance of the disc with respect to an optical axis of the objective lens. The thus-reduced disc tilt allowance can be increased by reducing the thickness of the disc.

Assuming that the tilt angle of the disc is θ, the magnitude of a coma aberration coefficient $W_{31}$ can be obtained from:

$$W_{31} = -\frac{d}{2}\left(\frac{n^2(n^2-1)\sin\theta\cos\theta}{(n^2-\sin^2\theta)^{\frac{5}{2}}}\right)NA^3$$

where d and n represent the thickness and refractive index of the disc, respectively. As understood from the above relationship, the coma aberration coefficient is proportional to the cube of the numerical aperture. Therefore, considering that the numerical aperture of the objective lens required for a conventional compact disc is 0.45 and that for a digital video disc is 0.6, a digital video disc has a coma aberration coefficient of about 2.34 times that of a compact disc. The maximum tilt allowance of the digital video disc is therefore controlled to be reduced to about half that of the conventional compact disc. Accordingly, to assimilate the maximum tilt allowance of the digital video disc to that of the compact disc, the thickness of the digital video disc should be reduced.

However, such a thickness-reduced disc adopting a shorter wavelength (high density) light source, e.g., a digital video disc, cannot be used in a conventional recording/reproducing apparatus, e.g., a disc drive for the compact disc adopting a longer wavelength light source, because a disc having a nonstandard thickness results in a spherical aberration corresponding to the difference in disc thickness from that of a normal disc. If the spherical aberration is greatly increased, the spot formed on the disc cannot have the light intensity necessary for recording, which prevents accurate recording of the information. Also, during reproduction, the signal-to-noise ratio is too low to reproduce the information accurately.

Therefore, an optical pickup adopting a light source having a short wavelength, e.g., 650 nm, which is compatible for discs having different thicknesses, such as a compact disc and a digital video disc, is necessary.

For this purpose, research into apparatuses which can reproduce and record information from/into two kinds of discs having different thicknesses with a single optical pickup device adopting a shorter wavelength light source are underway. Lens devices respectively adopting a hologram lens and refractive lens have been proposed (Japanese Patent Laid-open Publication No. Hei 7-98431).

FIGS. 1 and 2 show the focusing of zero-order and first-order-diffracted light onto discs 3a and 3b having different thicknesses, respectively. A hologram lens 1, having a lattice pattern 11, and a refractive objective lens 2 are provided along the light path in front of disc 3a (in FIG. 1) and 3b (in FIG. 2). The lattice pattern 11 diffracts light beams 4 from a light source (not shown) passing through the hologram lens 1, to thereby separate the passing light into first-order-diffracted light 41 and zero-order light 40, each of which is focused with a different intensity by objective lens 2 for the appropriate focus point on the thicker disc 3b or the thinner disc 3a, and thus enable data read/write operations with respect to discs having different thicknesses.

However, in using such a lens device, the separation of the light into two beams (i.e., the zero-order and first-order light) by hologram lens 1 lowers the utilizing efficiency of the actually regenerated light to about 15%. Also, during a read operation, the information is included in only one of the two beams, and the beam carrying no information is likely to be detected as noise. Moreover, the fabrication of such a hologram lens requires a high-precision process for etching a fine hologram pattern, which increases manufacturing costs.

FIG. 3 is a schematic diagram of a conventional optical pickup device (U.S. Pat. No. 5,281,797) which, in lieu of using a hologram lens as above, includes an aperture diaphragm 1a for changing the aperture diameter, so that data can be recorded onto a longer wavelength disc as well as a shorter wavelength disc and so that information can be reproduced therefrom. The aperture diaphragm 1a is installed between the objective lens 2 and a collimating lens 5 and controls a light beam 4 emitted from a light source 9 and transmitted through a beam splitter 6, by appropriately adjusting the area of the light beam passing region, i.e., the numerical aperture. The diametrical aperture of aperture diaphragm 1a is adjusted in accordance with the focused spot size on the disc being employed and always passes the light beam 4a of the central region but selectively passes or blocks the light beam 4b of the peripheral region. In FIG. 3, a reference numeral 7 denotes a focusing lens and reference numeral 8 denotes a photodetector.

In the optical device having the above configuration, if the variable diaphragm is a mechanical diaphragm, its structural resonance characteristics change depending on the diaphragm's effective aperture, and thus installation onto an actuator for driving the objective lens becomes difficult in practice. To solve this problem, liquid crystal may be used for forming the diaphragm. This, however, greatly impedes the miniaturization of the system, deteriorates heat-resistance and endurance, and increases manufacturing costs.

Alternatively, a separate objective lens for each disc may be provided so that a specific objective lens is used for a specific disc. In this case, however, since a driving apparatus is needed for replacing lenses, the configuration becomes complex and manufacturing cost increases accordingly.

SUMMARY OF THE INVENTION

It is an object of the present invention to provide an objective lens device which is inexpensive and easily fabricated, an optical pickup adopting the same, and a method for manufacturing an objective lens.

It is another object of the present invention to provide an objective lens device whose light utilizing efficiency is enhanced and which can form aberration-free spots, an optical pickup adopting the same, and a method for manufacturing an objective lens.

To accomplish the above and other objects, there is provided an objective lens device according to the present invention comprising an objective lens, having a central portion and a peripheral portion, provided along a light path of the incident light beam, facing a plane of the disc and having a predetermined effective diameter; and light controlling means provided along the light path of the incident light beam for controlling the light between near and far axis regions of the incident light beam so as not be focused on the disc, wherein the central portion of the objective lens, which corresponds to the near axis region of the incident light beam, has an optimum curvature and an aspherical coefficient for the disc both if the disc has a first thickness and if the disc has a second thickness greater than the first thickness.

Also, according to another aspect of the present invention, there is provided an optical pickup comprising a light source to generate the incident light beam; an objective lens having a central portion, an intermediate portion, and a peripheral portion, provided along a light path from the light source, facing a plane of the disc and having a predetermined effective diameter; light controlling means provided along the light path and facing the objective lens, for controlling the light of the intermediate region between near- and far-axis regions of the incident light beam not to be focused in the disc; a beam splitter provided between the light controlling means and the light source; and a photodetector for detecting the light reflected from the disc and split by the beam splitter, wherein the central portion of the objective lens corresponding to the near-axis region of the incident light beam has an optimum curvature and aspherical coefficient for the disc both if the disc has a first thickness and if the disc has a second thickness greater than the first thickness.

Also, according to still another aspect of the present invention, there is provided a method for manufacturing an objective lens, the method comprising the steps of providing a first mold having a light controlling forming portion for forming light controlling means, for controlling a light beam incident onto an intermediate portion between a central portion and a peripheral portion of the objective lens, wherein the light controlling portion corresponds to an intermediate region of light beams between a near-axis region and a far-axis region, and wherein the first mold is shaped to form the objective lens to have an optimum curvature and an aspherical coefficient for both a first disc having a first thickness, and a second disc having a second thickness greater than the first thickness; providing a second mold corresponding to the first mold; installing the first and second molds in a lens molding device; and molding the objective lens by inserting lens material between the first and second molds.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE INVENTION

In the present invention, the light around the central axis of the light path, i.e., in an intermediate region between near axis and far axis regions, is controlled, i.e., blocked or shielded to form a small light spot from which interference of the light in the intermediate region is suppressed. To this end, in the intermediate region between the near axis and the far axis along the incident light path, there is provided light controlling means of an annular or perimetrical polygon (e.g., square) shape for controlling, i.e., blocking or scattering light. The light controlling means utilizes the fact that the light of the far axis region does not affect the central light but the light of the intermediate region does. Here, the near axis region is the region around the central axis (optical axis) of the lens having a substantially negligible aberration, the far axis region is the region farther from the optical axis, and the intermediate region is between the near- and far-axis regions.

Figure 1:
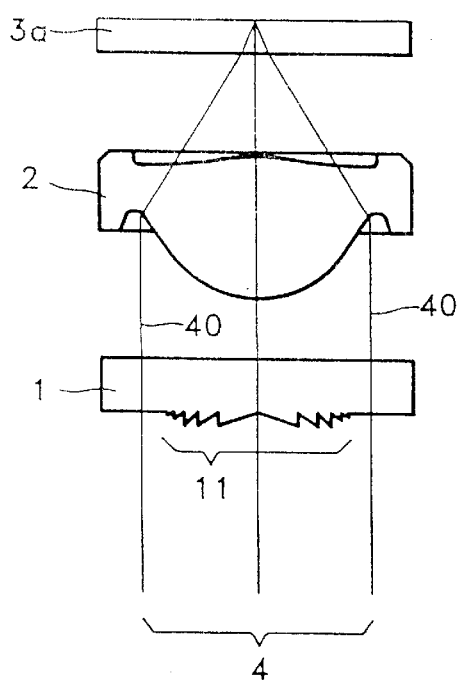
FIGS. 1 and 2 are schematic diagrams of a conventional optical pickup device having a hologram lens, showing the states where a light beam is focused onto a thin disc and a thick disc, respectively.
Figure 2:
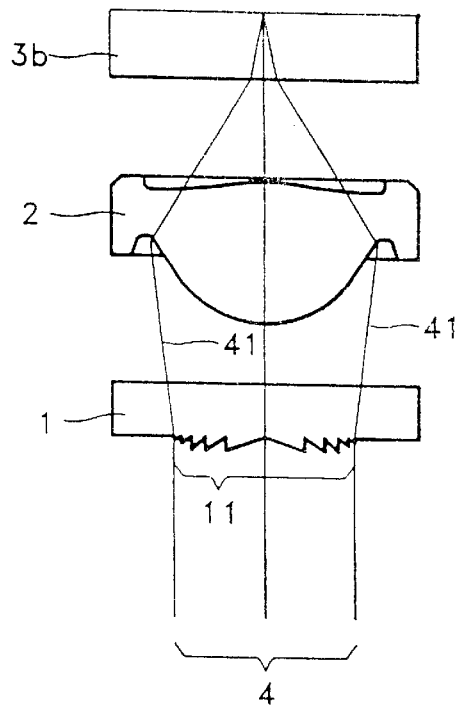
Figure 3:
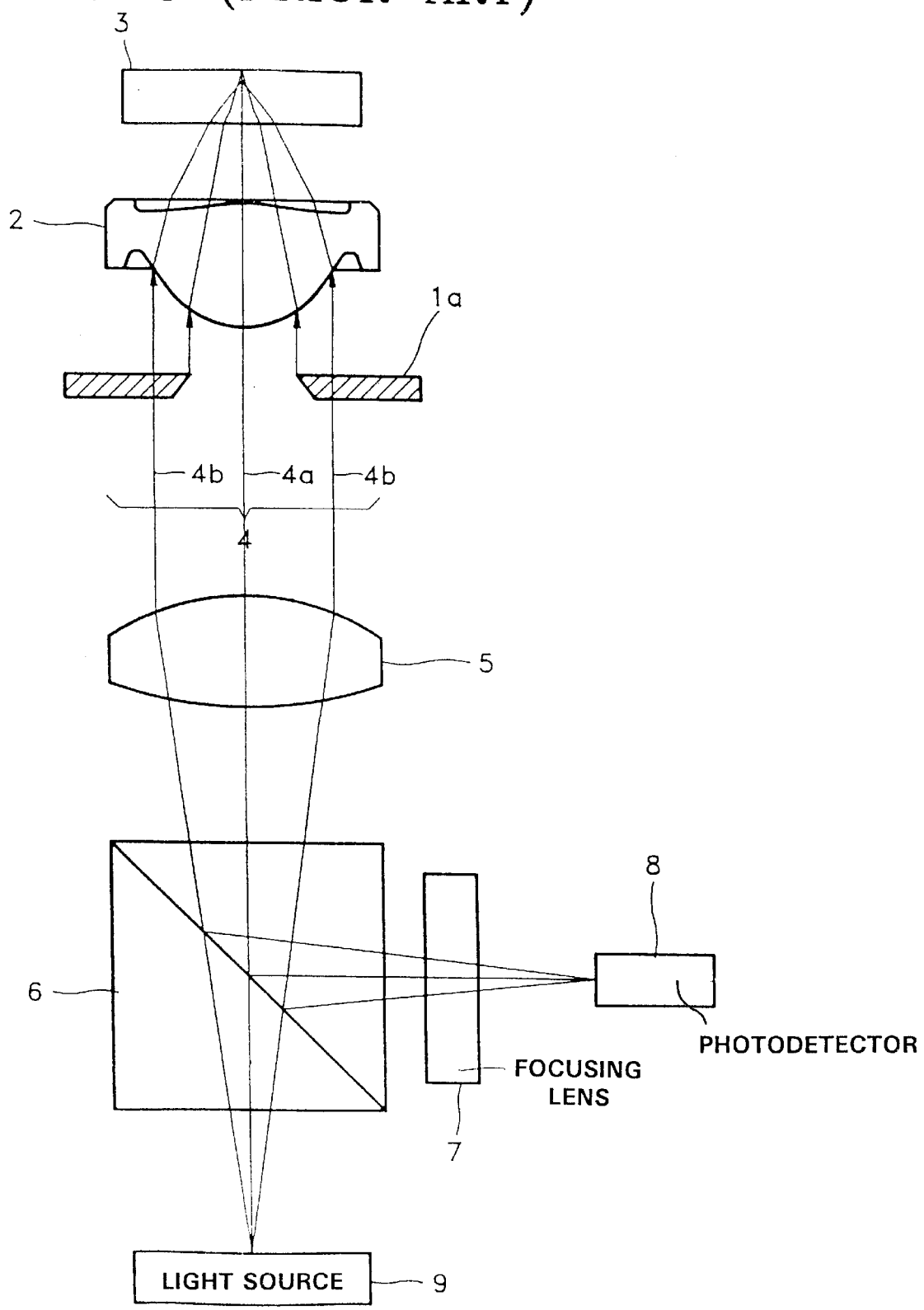
FIG. 3 is a schematic diagram of another conventional optical pickup device.
Figure 4:
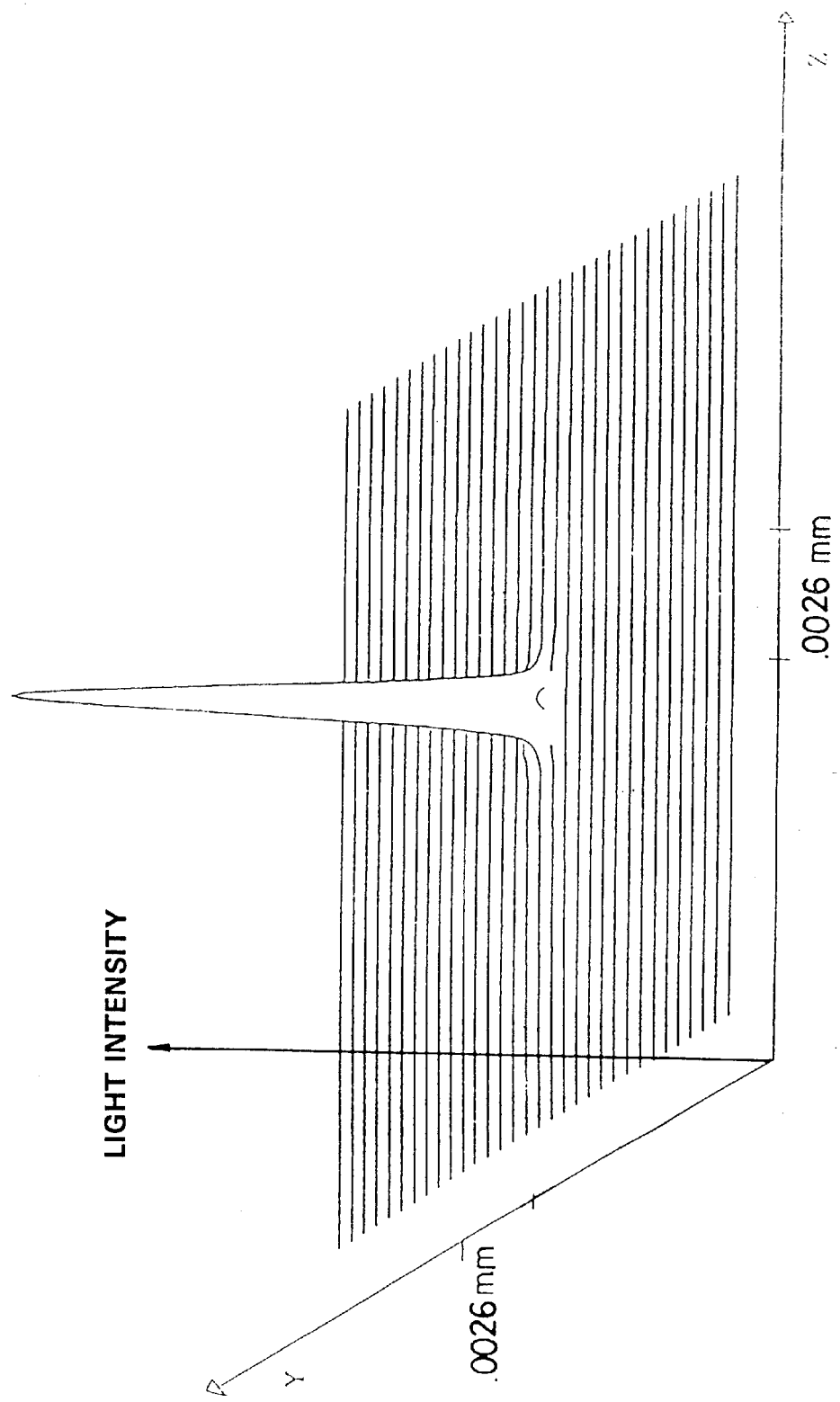
FIGS. 4 and 5 show the states where a light beam is being focused onto a thin disc and a thick disc, respectively, by a general objective lens and without using a hologram lens.

FIG. 4 shows a state where a light having a wavelength of 650 nm is focused onto a disc having a thickness of 0.6 mm and a refractive index of 1.5, by an objective lens having a refractive index of 1.505. As shown, the light spot has a diameter of 0.85 $\mu$m at the $1/e^2$ point (13% of light intensity).

Figure 5:
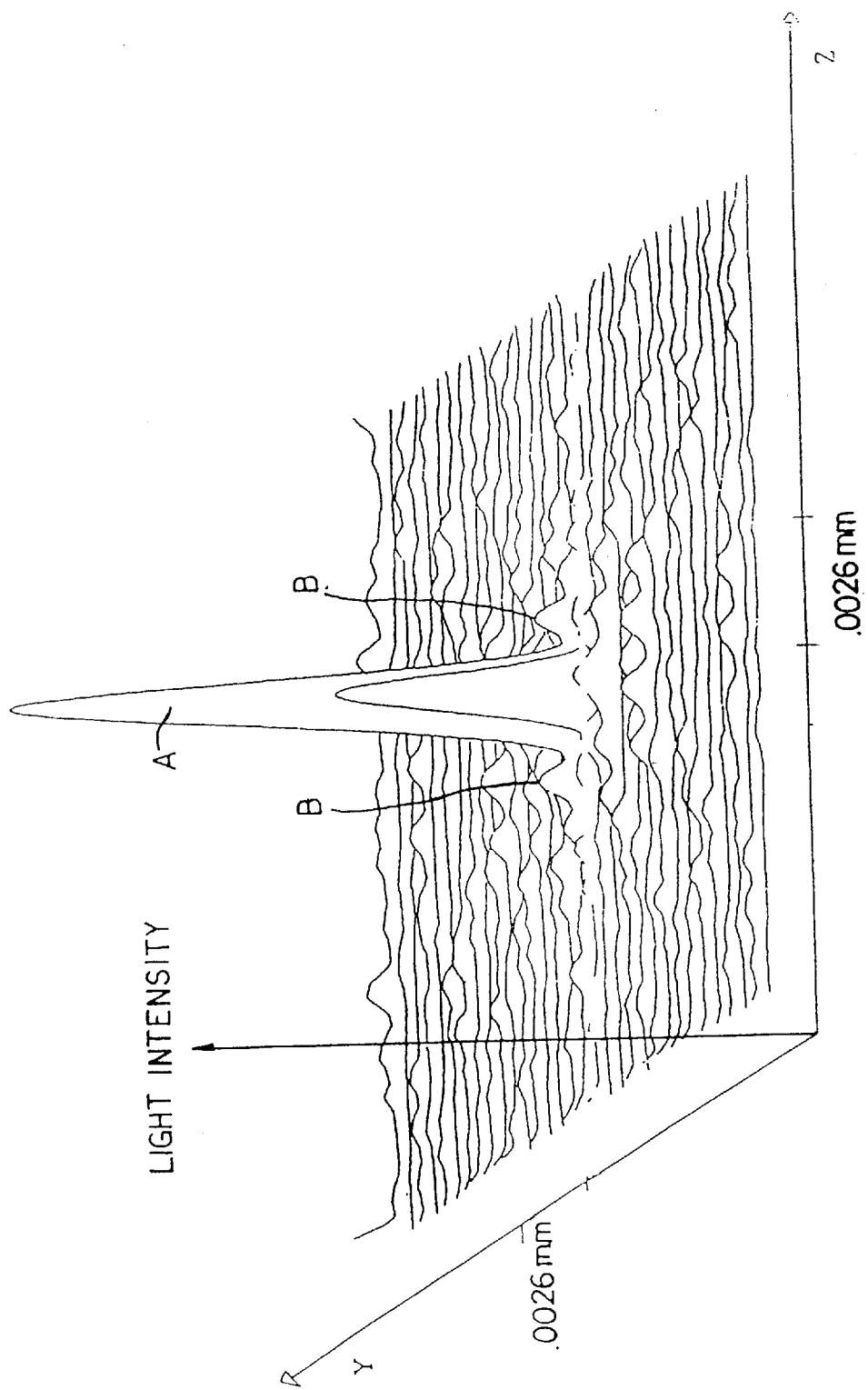

FIG. 5 shows a state where a light is focused onto a disc having a thickness of 1.2 mm under the same conditions as the 0.6 mm disc above. Referring to FIG. 5, the light spot having a 2 $\mu$m diameter is focused at a point (A) but also shows intensity at other points; e.g., the light intensity at points (B) where the central light is 5~10% that of the central region. Since the far-axis incident light is focused off the optical axis and is controlled, i.e., scattered, the light of the far axis region does not affect the focusing of the light spot of the intermediate region.

However, the light of the intermediate region is greatly affected by spherical aberration so that peripheral light beams (B) are generated around the central light beam (A). Therefore, the light spot of the thin disc, even though it is formed by the same objective lens, is larger than that of the thick disc. Such peripheral light beams generally have about 6~7% intensity of the central light beam, thereby generating jitter during light detection and thus making accurate data recording and reproduction difficult.

Figure 6A:
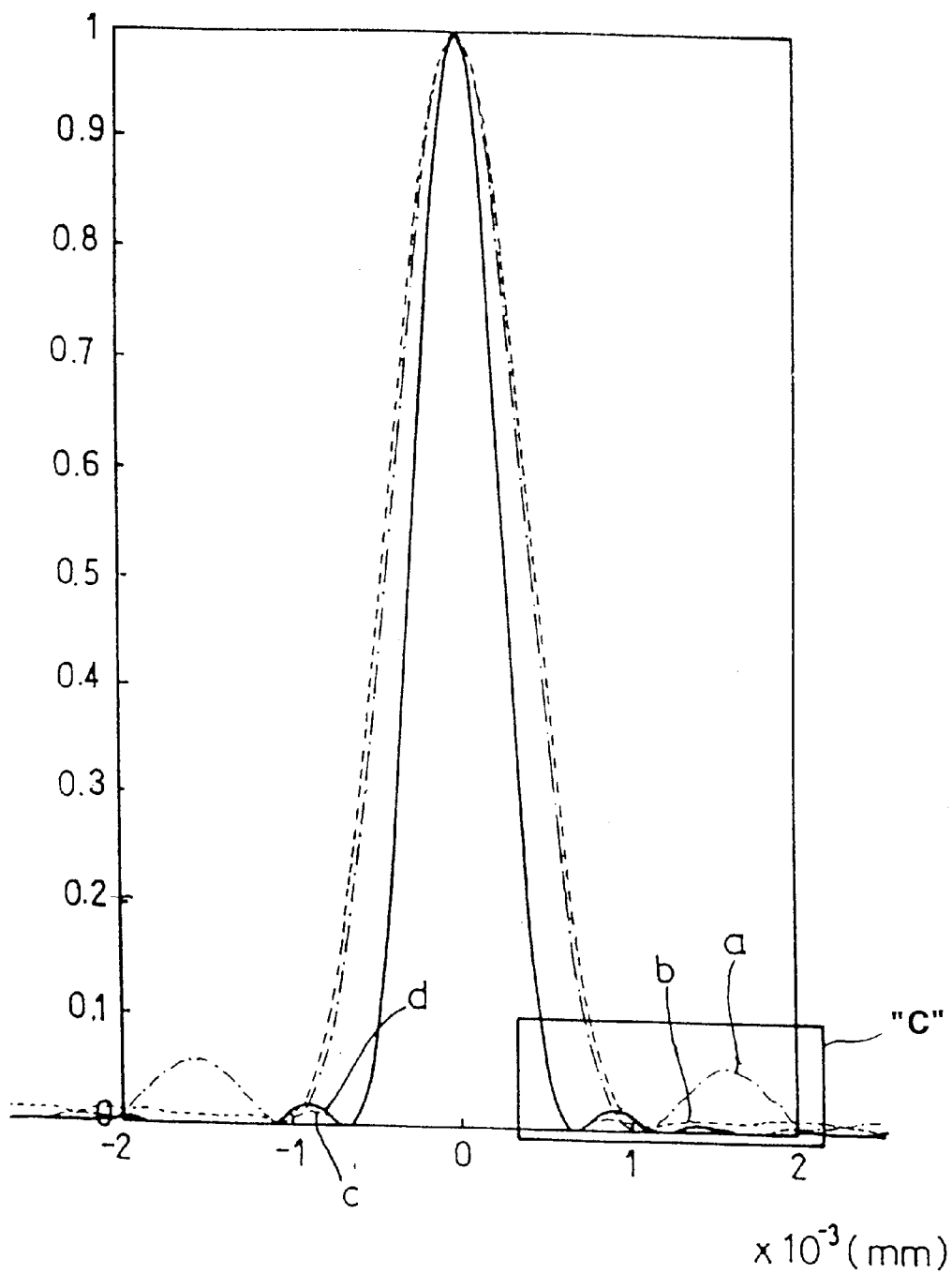
FIG. 6A is a graph showing the change in spot sizes, and 6B is a view of the "A" portion of the graph of FIG. 6A.

FIG. 6A plots the change in the light spot sizes, showing cases in which the light controlling means according to the present invention is adopted and it is not adopted. Here, an objective lens having a numerical aperture of 0.6 and an effective radius of 2 mm is used. As an example of the light controlling means for controlling the light, an annular light controlling film having a central height of 1.4 mm and a width of 0.25 mm is adopted.

Figure 6B:
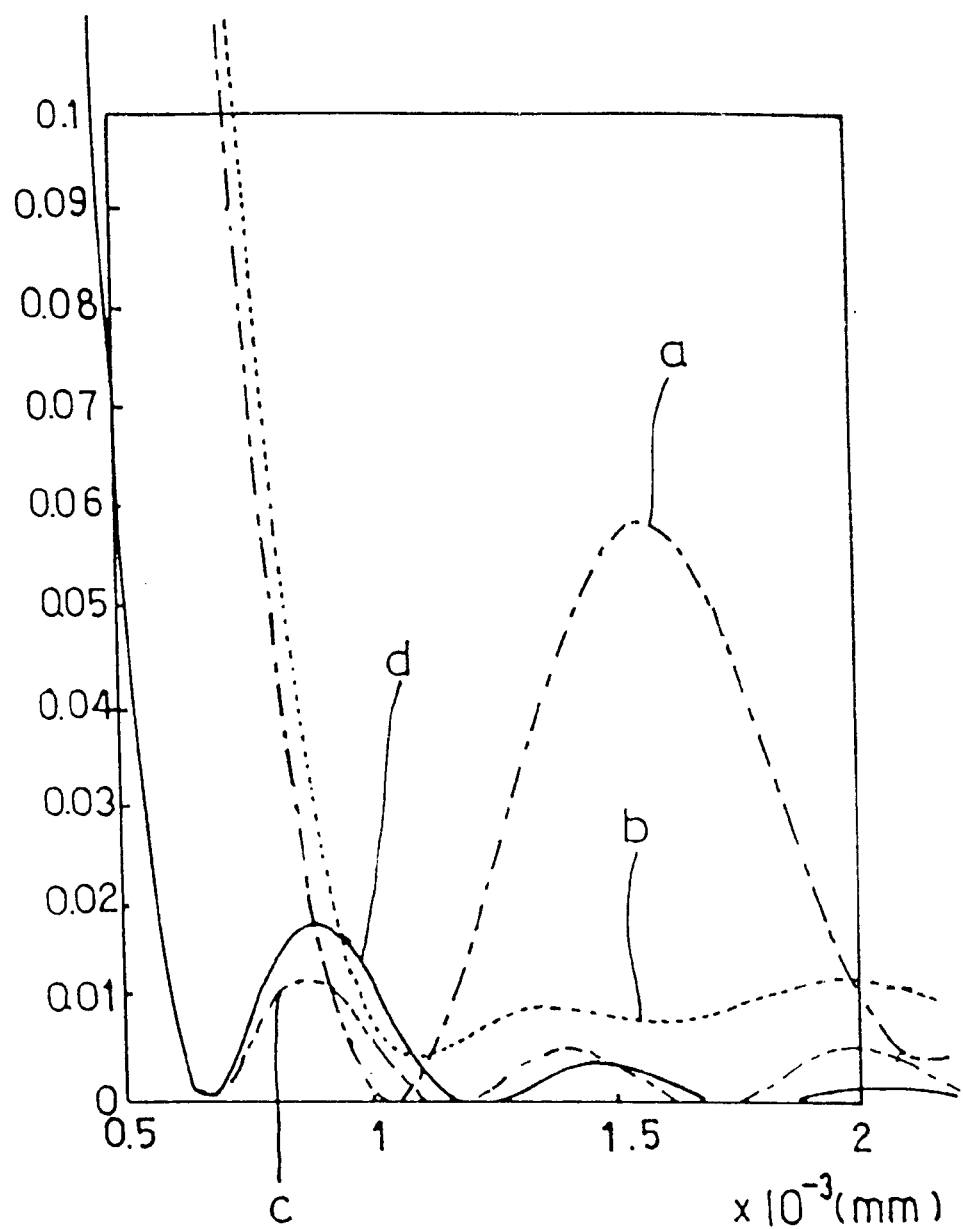

As shown in FIGS. 6A and 6B, under the above conditions, plots (c) and (d) are curves showing the change in light spot sizes when adopting a 0.6 mm disc, and plots (a) and (b) (shown in box "C") are for the case of adopting a 1.2 mm disc. Here, plots (b) and (c) are obtained when the light controlling means is adopted, and plots (a) and (d) are obtained when the light controlling means is not adopted.

According to the measurement, it is understood that the spot size difference is within 3%, depending on the presence of the light controlling film, when adopting a 0.6 mm disc. Also, when adopting a 1.2 mm disc, the size of a portion (B) is noticeably reduced by using the light controlling film, compared with that of a portion (A), as shown in FIG. 5.

Therefore, as described above, according to the present invention, the light passing through the region between the near axis and the far axis, which makes the peripheral light spot large by affecting the focusing of the central light, is controlled, thereby avoiding the concurrent focusing on the spots formed by the light beams of the far axis region and the near axis region.

For this purpose, light controlling means is provided along the light path, for controlling the light of the intermediate region to reflect the light in a direction irrelevant to that of controlled light or the spot, thereby suppressing the increase of the peripheral light of the light spot and removing the spherical aberration.

Figure 7:
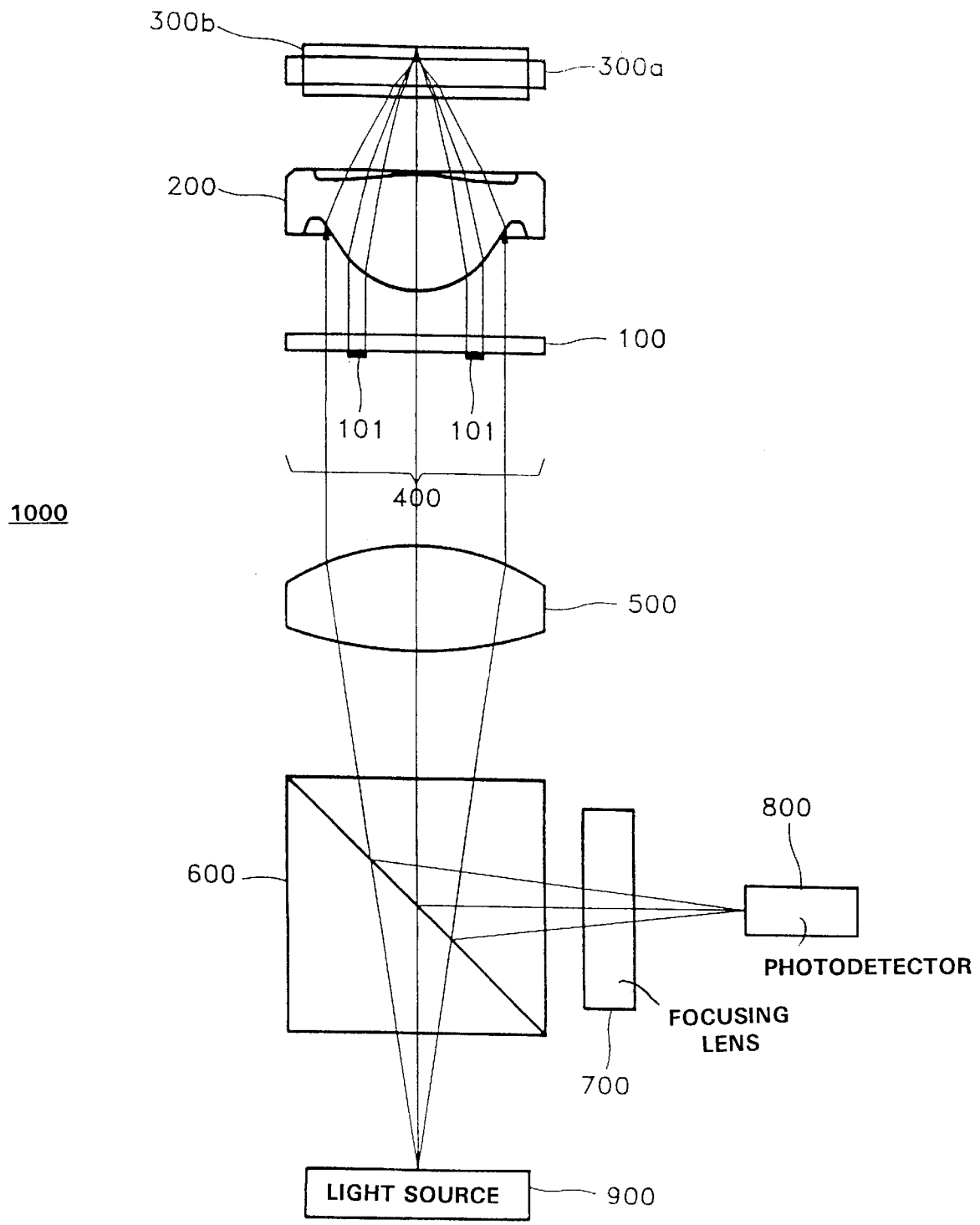
FIG. 7 is a schematic diagram of an optical pickup device adopting an objective lens device according to a first embodiment of the present invention.
Figure 8:
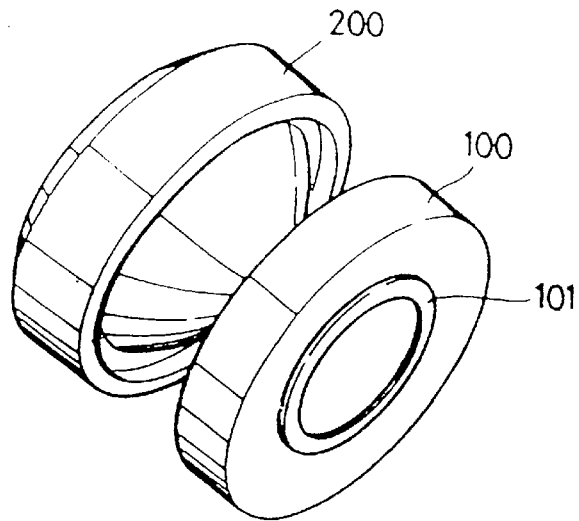
FIG. 8 is a perspective view of the objective lens device shown in FIG. 7.

FIG. 7 is a schematic diagram of an optical pickup device adopting an objective lens device 1000 according to a first embodiment of the present invention, for comparing the light focusing with respect to a thin disc (digital video disc) and a thick disc (compact disc); and FIG. 8 is a perspective view of the objective lens device shown in FIG. 7. Here, the objective lens device 100 includes an objective lens 200 and a light controlling member 100 as light controlling means.

In FIG. 7, reference numerals 300a and 300b denote comparatively thin (e.g., 0.6 mm) and comparatively thick (e.g., 1.2 mm) information recording media, i.e., a disc, respectively. The disk 300a or 300b is placed in a disk drive (not shown). The objective lens 200 of a shape featuring the present invention is positioned in front of the disc 300a or 300b. The objective lens 200 focuses an incident light 400 from a light source 900 onto the disc 300a or 300b and receives the light reflected therefrom. For example, as shown in the following Table 1, in the objective lens 200 according to the present invention, the portion corresponding to the near axis region of the incident light 400 has the optimum curvatures and aspherical coefficients for both the thick disc (compact disc) 300b and thin disc (digital video disc) 300a.

TABLE 1

| | curvature | thickness | refractive index | | aspherical coefficient |
|---|---|---|---|---|---|
| front surface of obj. lens | 2.06009 | 2.570160 | 1.515 | K:<br>A:<br>B:<br>C:<br>D: | −0.579532<br>0.175259E−02<br>0.206521E−04<br>−0.269572E−04<br>0.117293E−04 |
| rear surface of obj. lnes | −5.97115 | 1.53409<br>(1.15509) | 1.000 | K:<br>A:<br>B:<br>C:<br>D: | −41.081867<br>0.505247E−02<br>−0.599930E−03<br>0.188763E−03<br>−0.230038E−04 |
| disc | ∞ | 0.6<br>(1.2) | 1.550 | | — |

The above lens data pertains to a 650 nm light source, for both the 1.2 mm and 0.6 mm discs. Also, the peripheral portion of the objective lens 200 corresponding to the far axis region of the incident light 400 is optimized only with respect to the thin disc (digital video disc) 300a.

In the following Table 2, the aberration characteristics of the objective lens according to the present invention and those of the conventional objective lens are compared in terms of disc type (thickness).

TABLE 2

| | digital video disc (0.6 mm) | | compact disc (1.2 mm) | |
|---|---|---|---|---|
| | field | optical aberration (λ rms) | field | optical aberration (λ rms) |
| present invention | 0.0° | 0.017 | 0.0° | 0.055 |
| | 0.5° | 0.019 | 0.5° | 0.057 |
| | 1.0° | 0.040 | 1.0° | 0.057 |
| prior art | 0.0° | 0.002 | 0.0° | 0.063 |
| | 0.5° | 0.021 | 0.5° | 0.063 |
| | 1.0° | 0.048 | 1.0° | 0.063 |

Considering that a general optical pickup is designed to have an optical aberration of 0.07λrms or below, it is understood from Table 2 that the objective lenses according to the present invention have good optical characteristics for both disc types. Also, as shown in FIGS. 37A through 43B, since both the field aberration and ray aberration range are within five microns, the objective lens according to the present invention can be manufactured by an injection molding method or a compression molding method.

Figure 9:
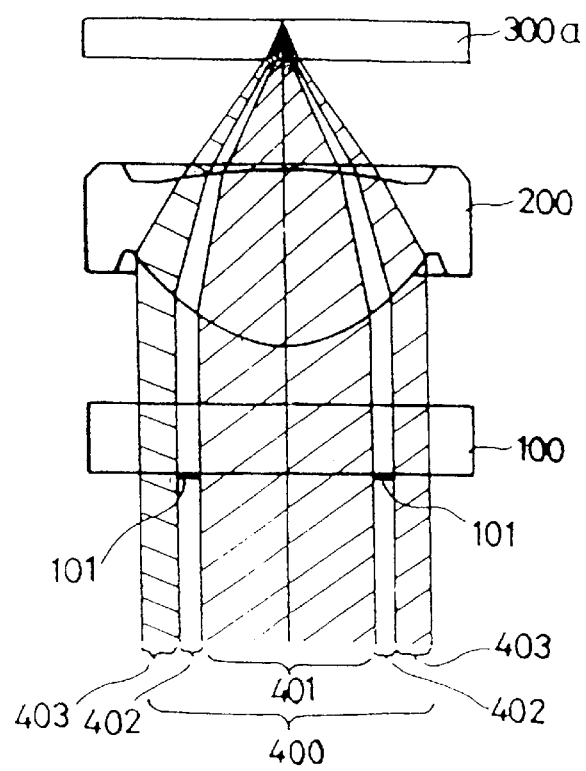
FIG. 9 shows states where light beams are focused onto thick and thin discs by the objective lens device shown in FIG. 7.

As shown in FIGS. 7–9, a light controlling member 100 is provided to the rear of the objective lens 200, which is a feature of the present invention. The light controlling member 100 is made of a transparent material and has a light controlling film 101 of an annular shape for controlling the incident light on its surface. The outer diameter of the light controlling film 101 is smaller than the effective diameter of the objective lens 200. Here, the light controlling film 101 is formed in a single body and may be formed in a complex body of at least two rings which are arranged as an annular ring.

A collimating lens 500 and a beam splitter 600 are provided between the light controlling member 100 and light source 900, as shown in FIG. 7. A focusing lens 700 and a photodetector 800 are provided along the travelling path of the light reflected from the beam splitter 600. Here, the photodetector 800 is basically formed as a 4-segmented structure.

The light controlling film 101 controls, i.e. blocks, scatters or reflects, among the beams of the incident light 400, the light beam 402 of the intermediate region between the near axis and the far axis, thereby transmitting only the light beams 401 and 403 passing through the near and far axes, as shown in FIG. 9.

Figure 10:
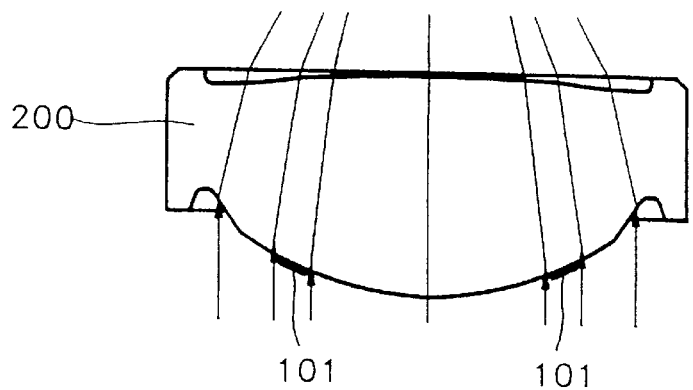
FIG. 10 is a section view of an objective lens device having an objective lens provided with a light controlling film formed on the surface thereof, according to a second embodiment of the present invention.
Figure 11:
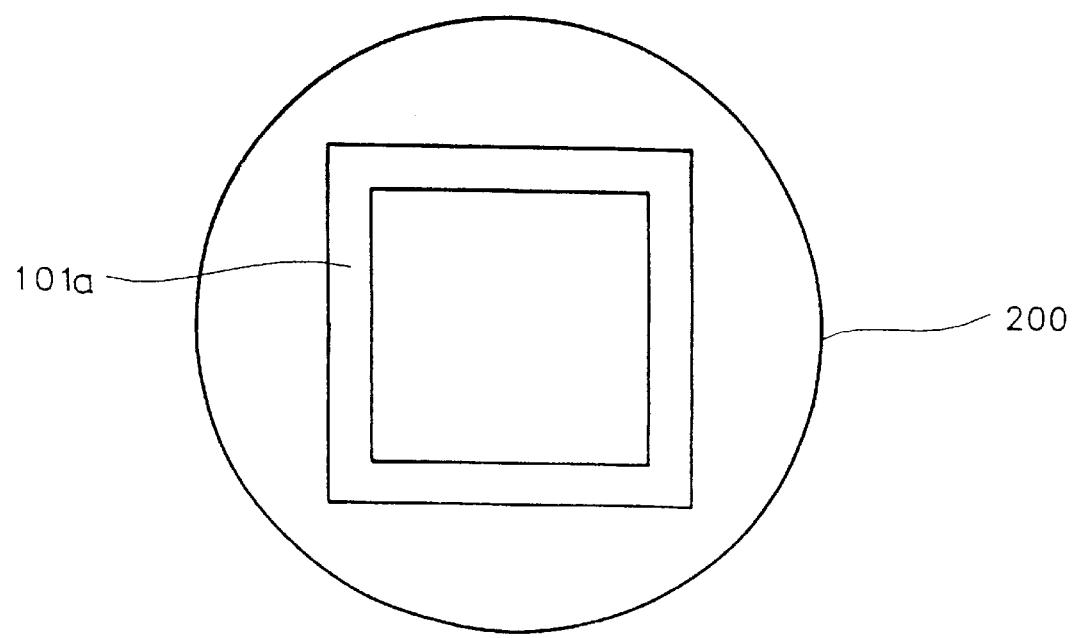
FIG. 11 is a front view of an objective lens device having an objective lens provided with a square light control groove, according to a third embodiment of the present invention.

The light controlling film 101 having the above-described function is directly coated on at least one surface of the objective lens 200, as shown in FIG. 10. Otherwise, as shown in FIG. 11 illustrating a third embodiment of the present invention, a light controlling film 101a may be modified in its structure to have a perimetrical polygon shape, such as a square or pentagon.

Figure 12A:
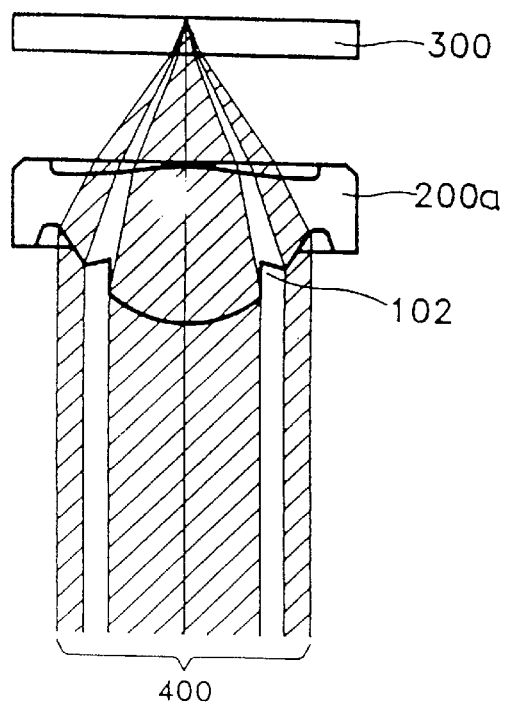
FIGS. 12A and 12B are schematic diagrams of an objective lens device according to fourth and fifth embodiments of the present invention, showing light being focused onto a disc, respectively.
Figure 12B:
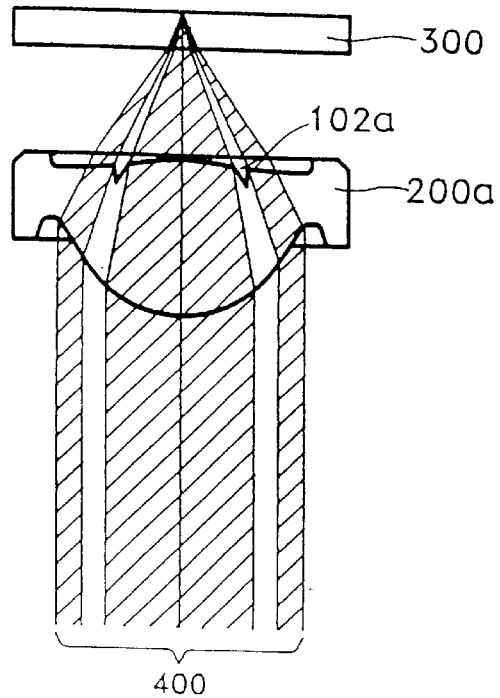
Figure 13:
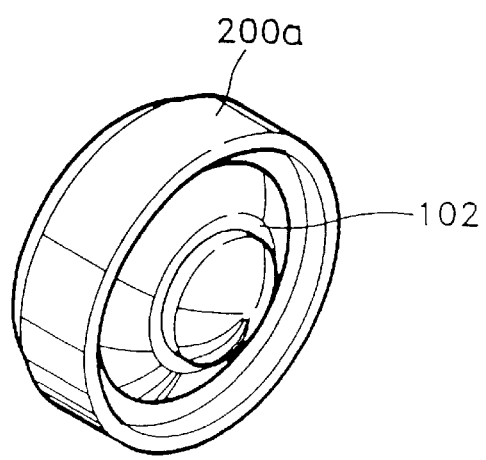
FIG. 13 is a schematic perspective view of the objective lens device shown in FIG. 12A.
Figure 14A:
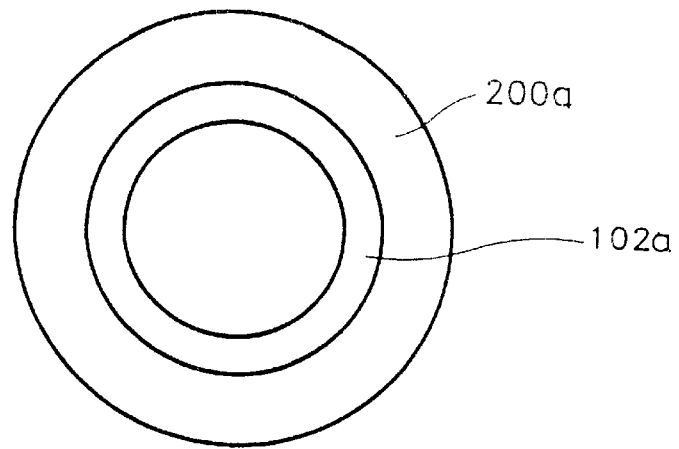
FIG. 14A is a schematic front view of the objective lens device shown in FIG. 12A.

FIGS. 12A and 12B illustrate an objective lens device according to fourth and fifth embodiments of the present invention, respectively. In FIG. 12A, a light controlling groove 102 of an objective lens 200a is formed on the side where the incident light 400 is received. In FIG. 12B, the light controlling groove 102a is formed on the side where the incident light 400 is emitted. FIGS. 13 and 14A are a perspective view and a front view of an objective lens 200a adopted in the objective lens device shown in FIG. 12A, respectively. In these embodiments, there is provided light controlling means in the objective lens 200a. In other words, a structural pattern, i.e., a light controlling groove 102 of the annular shape, for partially controlling the incident light, is provided in the light receiving side of the objective lens 200a. The outer diameter of the light controlling groove 102 is smaller than the effective diameter of the objective lens 200a. As in the case of the aforementioned light controlling film, the light controlling groove 102 is provided in the intermediate light region and functions to reflect the incident light in a direction irrelevant to the light controlling, i.e., blocking, scattering or focusing.

Figure 14B:
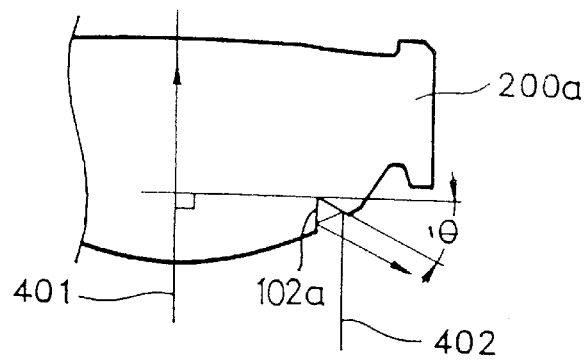
FIG. 14B is a view of an objective lens device according to a sixth embodiment of the present invention.

The light controlling groove 102a is preferably formed for the bottom surface thereof to be tilted by a predetermined angle θ with respect to the optical axis, not to be perpendicular, as shown in FIG. 14B. Otherwise, the light beam 402 of the intermediate region, which is reflected from light controlling groove 102a, is preferably controlled in the direction not being parallel to the optical axis. This suppresses the optical impediments due to the light controlled from the light controlling groove 102a.

Figure 16:
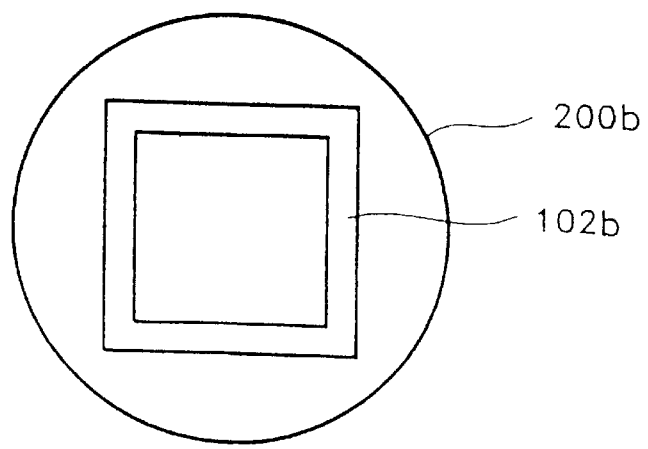
FIG. 16 is a front view of an objective lens in an objective lens device according to an eighth embodiment of the present invention.

FIG. 16 is a front view of an objective lens having a light controlling groove as light controlling means, in an objective lens device according to an eighth embodiment of the present invention, where a light controlling groove 102b of a perimetrical square is formed in an objective lens 200b as an embodiment of the present invention.

The objective lens 200b can be manufactured by a general high-pressure injection molding method or a compression molding method, using a mold having each pattern corresponding to the light controlling groove 102, 102a or 102b. Here, the light controlling groove may be formed of a perimetrical polygon shape other than a square, and the light controlling means may be in the form of a structural protrusion rather than a groove.

Figure 15A:
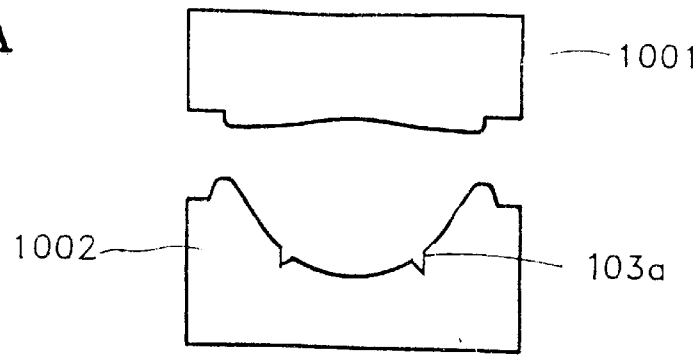
FIG. 15A is a side view of a mold for manufacturing the objective lens shown in FIG. 12B.
Figure 15B:
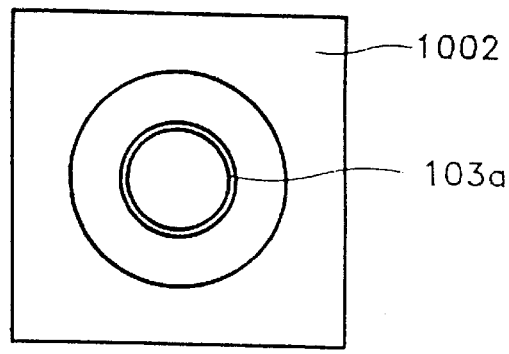
FIG. 15B is a plan view showing the inside of the lower frame of the mold shown in FIG. 15A.
Figure 15C:
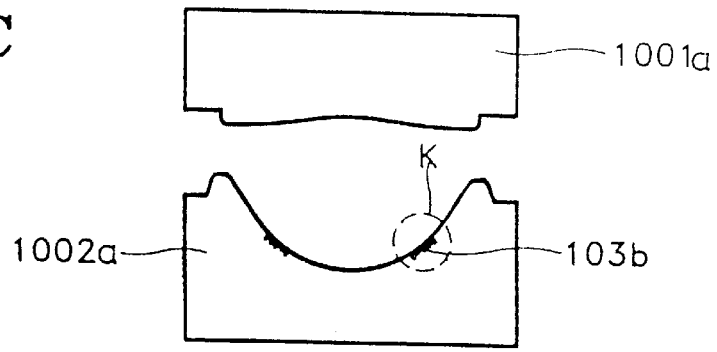
FIG. 15C is a side view of a mold for manufacturing an objective lens 5 according to a seventh embodiment of the present invention.
Figure 15D:
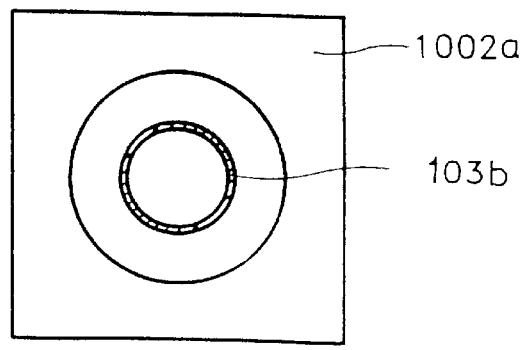
FIG. 15D is a plan view showing the inside of the lower frame of the mold shown in FIG. 15C, FIGS. 15E–15G are views of the "K" portion of FIG. 15C, each illustrating various types of molds, FIGS. 15H and 15I sequentially show a manufacturing process of the objective lens of the present invention.
Figure 15E:
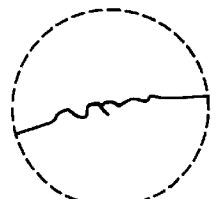
FIG. 15J is a side view of the objective lens manufactured by the processes shown in FIGS. 15H and 15I.
Figure 15F:
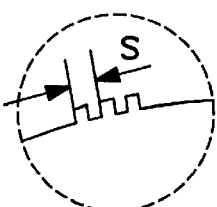
Figure 15G:
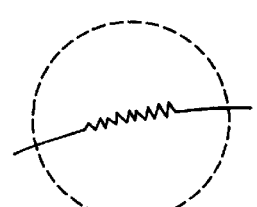
Figure 15H:
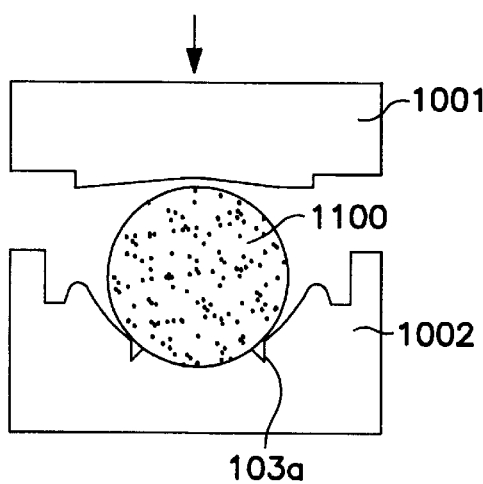
Figure 15I:
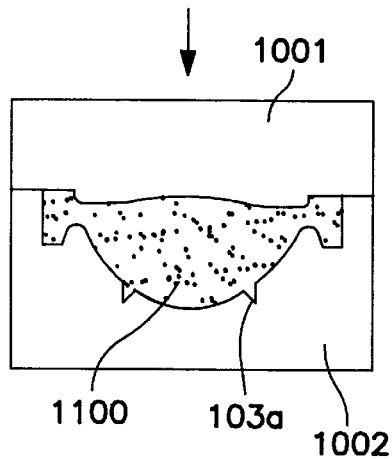

FIG. 15A is a side view of an upper mold 1001 and a lower mold 1002 having a groove 103a for forming the light controlling means formed on the bottom plane thereof, in a mold device for manufacturing an objective lens having protrusion-type light controlling means. FIG. 15B is a plan view of the lower mold 1002 showing the groove 103a shown in FIG. 15A. FIG. 15C is a side view of an upper mold 1001a and a lower mold 1002a having a groove 103b for forming the light controlling means formed on the bottom plane thereof, in a mold device for manufacturing an objective lens having light controlling means provided in an irregular shape, in an objective lens device according to a seventh embodiment of the present invention. FIG. 15D is a plan view of the lower mold 1002a shown in FIG. 15C. FIGS. 15E–15G show various examples of the processed planes formed in the lower mold 1002 of the mold device for forming the light controlling means, which may be rendered in a single- or complex-type form. Using such molds, the objective lens is provided with stepped, wedge-shaped or diffraction-lattice-shaped light controlling means protruding from the surface of the lens, respectively.

Figure 15J:
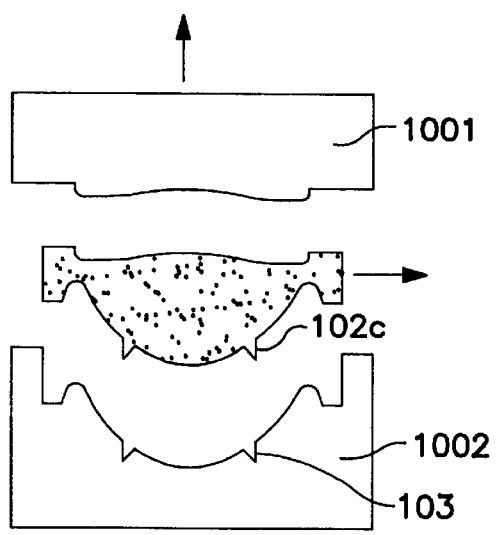
Figure 15K:
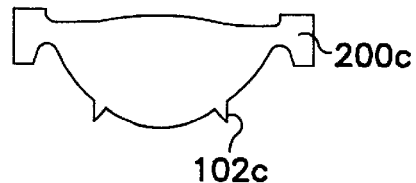

The objective lens showing the feature of the present invention can be manufactured by the compression molding method, as shown in FIGS. 15H–15K. A material 1100 is placed in the lower mold 1002 (FIG. 15H), the material 1100 is pressed by the upper mold 1001 (FIG. 15I) and the upper mold 1001 is separated from the lower mold 1002 (FIG. 15J). Thus, an objective lens 200c having a light controlling protrusion 102c as light controlling means is completed, as shown in FIG. 15K.

Figure 17:
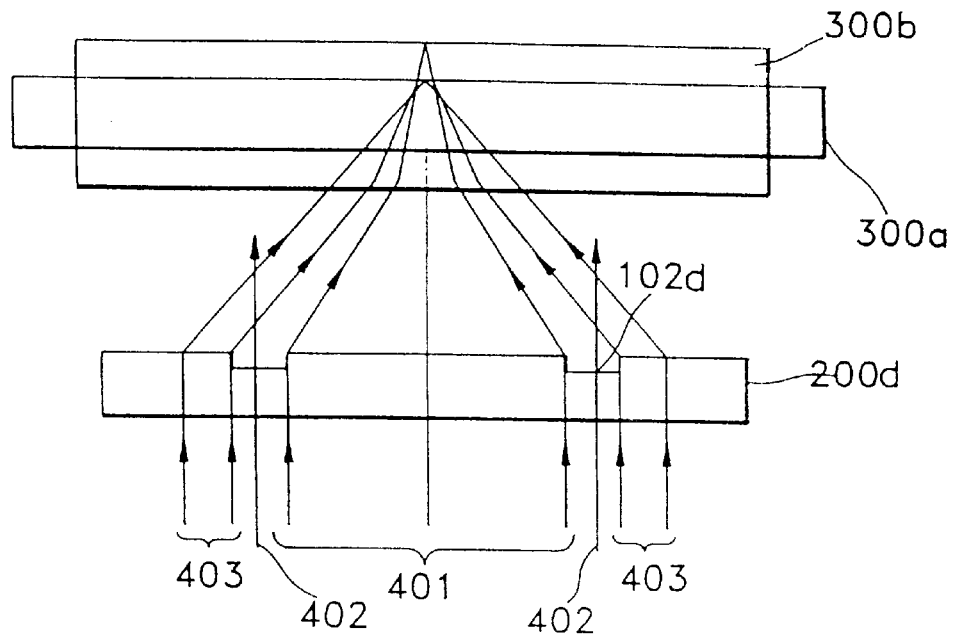
FIGS. 17 and 18 are schematic diagrams of an objective lens device according to ninth and tenth embodiments of the present invention, showing states where a light beam is being focused by a plane lens onto two discs of different thicknesses, respectively.
Figure 18:
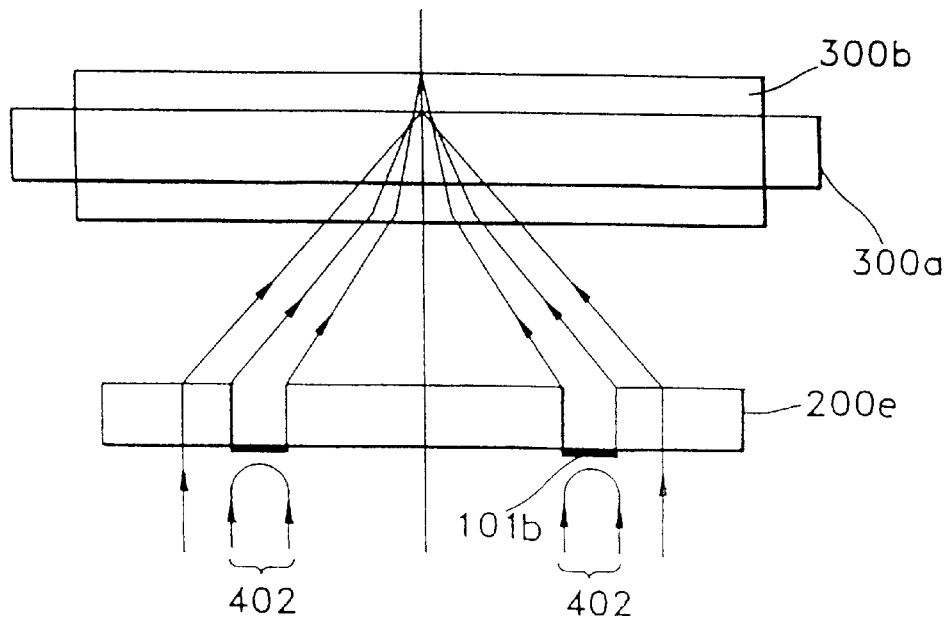

In the above embodiments, a convex lens is used as the objective lens, which might be replaced by a plane lens adopting a diffraction theory, such as a hologram lens or a Fresnel lens, whichever is adoptable. Specifically, when the lens is provided with light controlling means, a light controlling groove 102d of an annular or square shape is formed in a plane lens, as shown in FIG. 17 (ninth embodiment). Otherwise, a separately fabricated light controlling film 101b of an annular or square shape may be fixed or coated, as shown in FIG. 18 (tenth embodiment). The light controlling groove 102d transmits the light 402 of the intermediate region without diffraction. Otherwise, the light controlling groove 102d reflects the light 402 in a direction irrelevant to the light focusing. Thus, the light 402 of the intermediate region is prevented from reaching the desired spot of a disc 300a or 300b. The light controlling film 101a for controlling, i.e., absorbing, scattering or reflecting the light beam 402 of the intermediate region, which is incident to the plane lens 200e, prevents the light beam 402 of the intermediate region from reaching the desired spot of the disc 300a or 300b.

Figure 19:
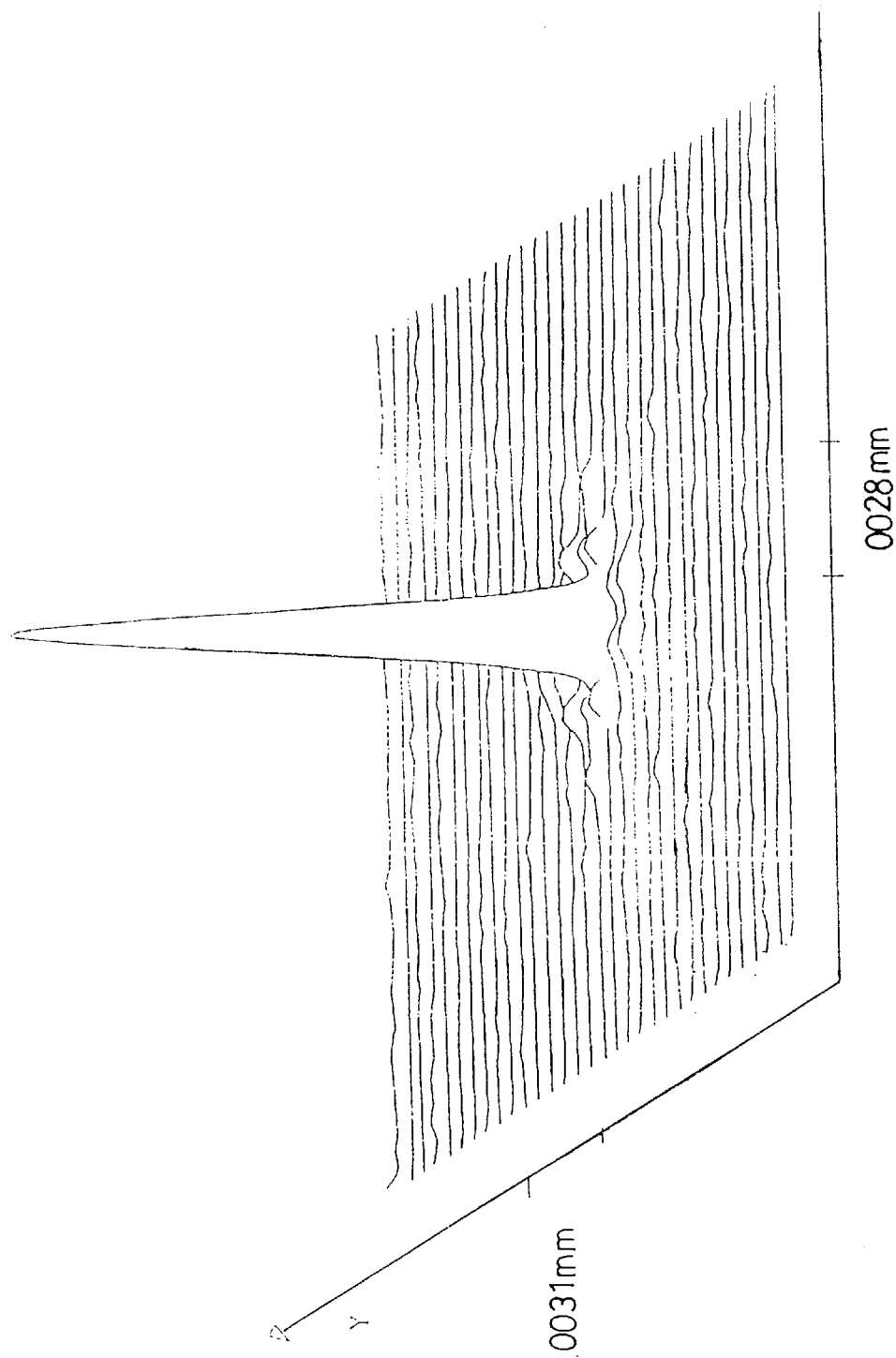
FIGS. 19 and 20 are three-dimensional plots showing the states where the light is focused onto a thick disc and a thin disc, respectively, by the objective lens device according to the present invention.

FIG. 19 shows the size of the light spot on a 1.2 mm thick disc, as obtained by the above embodiments. The objective lens adopted herein has an effective diameter of 4 mm, a diameter of the near axis region of 2 mm and that of the far axis region of 2.4–4.0 mm. Thus, the light controlling means blocks the light beams ranging from 2.0 mm to 2.4 mm in diameter. In the light spot formed by the above conditions, as the result of the measurement, the diameter of the light spot at a point of $1/e^2$ (approx. 13%) of the central light intensity was 1.3 $\mu$m. Compared to the device shown in FIG. 5, which does not adopt a light controlling film, the light amount of the portion "B" shown in FIG. 5 is reduced by more than 70% in the case of the device according to the present invention, which adopts a light controlling film.

Figure 20:
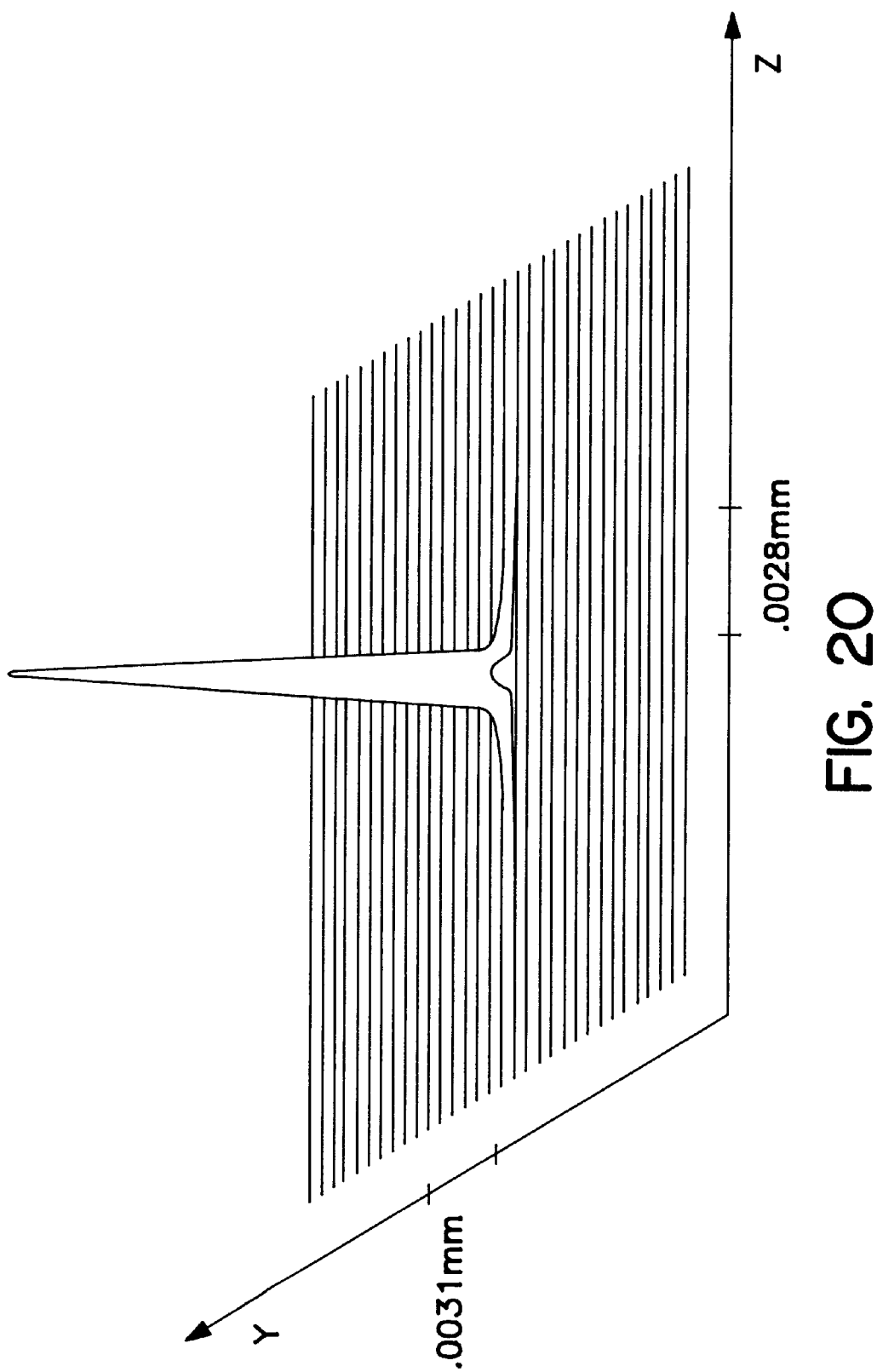

FIG. 20 shows the size of the light spot on a comparatively thin disc, i.e., a 0.6 mm disc, under the above-described conditions. According to the measurement, the diameter of the light spot at a point of $1/e^2$ (approx. 13%) of the central light intensity was 0.83 $\mu$m.

As described above, according to the present invention, a light spot can be formed on a disc in an optimized state. As shown in FIG. 7, the light reflected from the disc is transmitted through the objective lens 200, light controlling member 100 and collimating lens 500 and is reflected from the beam splitter 600 to then be transmitted through the focusing lens 700 to reach the photodetector 800 and be detected as an electrical signal. The photodetector 800 for obtaining a focus error signal by astigmatic aberration is generally a 4-segmented detector, which is a feature of the present invention.

Hereinbelow, the characteristics of the photodetector 800 in the present invention will be described in detail.

Figure 21:
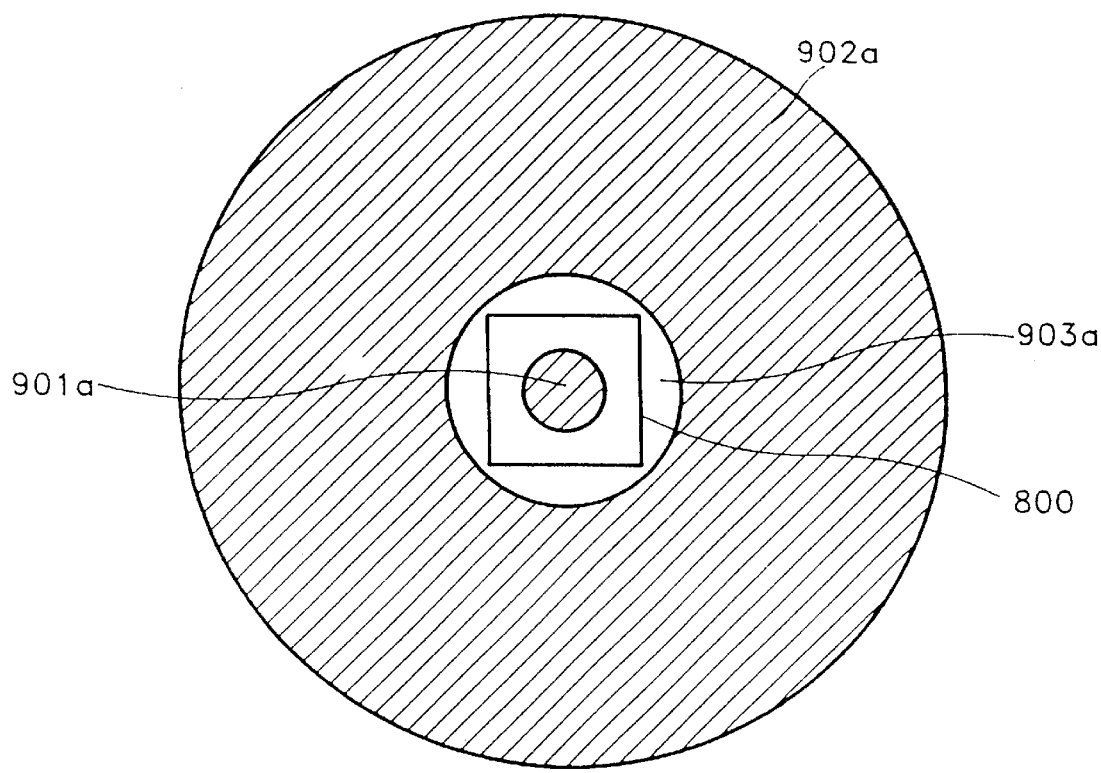
FIGS. 21 and 22 are plan views of photodetectors, in which a thick disc and a thin disc are used with the optical pickup according to the present invention and showing states where light is incident to each photodetector, respectively.
Figure 22:
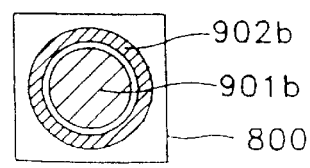

As shown in FIGS. 21 and 22, a spot formed in the center of the photodetector 800 has central regions 901a and 901b corresponding to the light of the near axis region and peripheral regions 902a and 902b corresponding to the light of the far axis region. FIG. 21 shows the case of adopting a comparatively thick disc, e.g., a 1.2 mm disc, and FIG. 22 shows the case of adopting a comparatively thin disc, e.g., a 0.6 mm disc. The change in diameters is insignificant in the central region 901a by the light of the near axis region, irrespective of the disc thickness. However, the change in diameters is significant in the intermediate region 903a and peripheral regions 902a and 902b, in which the light is blocked by the light controlling member 100.

First, referring to FIG. 21, central region 901a corresponding to the near axis region is in the center of photodetector 800 and peripheral region 902a surrounds the photodetector. Intermediate region 903a between central region 901a and peripheral region 902a is the portion from which the light is eliminated by a light controlling member. In other words, since peripheral region 902a and intermediate region 903a are substantially enlarged by spherical aberration, only the light of the near axis is used in reproducing information from a 1.2 mm thick disc.

Referring to FIG. 22, both central region 901b and peripheral region 902b are formed on the detection surface of photodetector 800. In other words, all of the light of the near- and far-axis regions are used in reproducing information from a thin (0.6 mm) disc, excluding the light of the intermediate region which is eliminated by a light controlling member. Here, the diameter of central region 901b maintains a relatively constant value irrespective of the disc type.

As described above, to read information from at least two kinds of discs having different thicknesses, respectively, the optical pickup device according to the present invention adopts the photodetector 800 devised so as to receive only the light of the near axis region in reading information from a thick disc and receive the light of the near- and far-axis regions in reading information from a thin disc. Therefore, when a thick disc is used, a signal corresponding to the light of the near axis region is obtained. When a thin disc is used, a relatively high signal corresponding to the light of the near- and far-axis regions is obtained.

Figure 23:
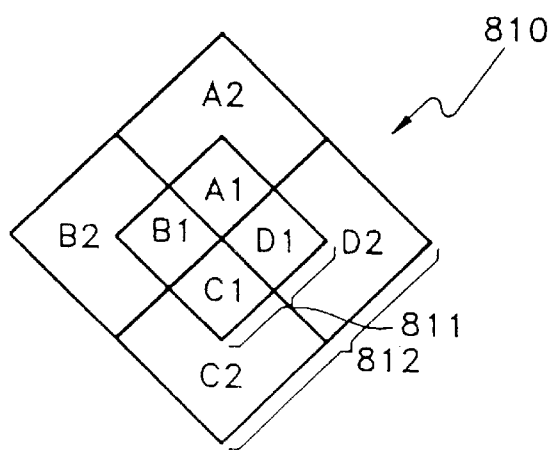
FIG. 23 is a plan view of an 8-segmented photodetector adopted for the optical pickup according to the present invention.

FIG. 23 shows another type photodetector, namely photodetector 810, which is an 8-segmented structure wherein a second detection region 812 is provided around a first detection region 811 which is centrally located and equivalent to the 4-segmented photodetector 800 shown in FIG. 21. Here, the first detection region 811 consists of four square first-light-receiving elements A1, B1, C1 and D1, and the second detection region 812 consists of four L-shaped second-light-receiving elements A2, B2, C2 and D2.

Figure 24:
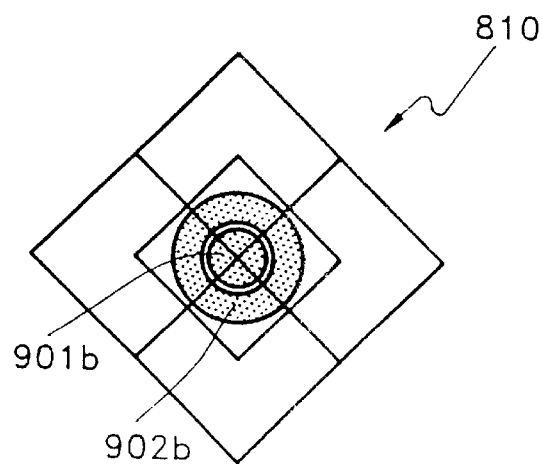
FIGS. 24–26 and 27–29 are plan views showing the light receiving region formed on the 8-segmented photodetector, depending on an objective lens position relative to a thin disc and a thick disc, respectively.
Figure 25:
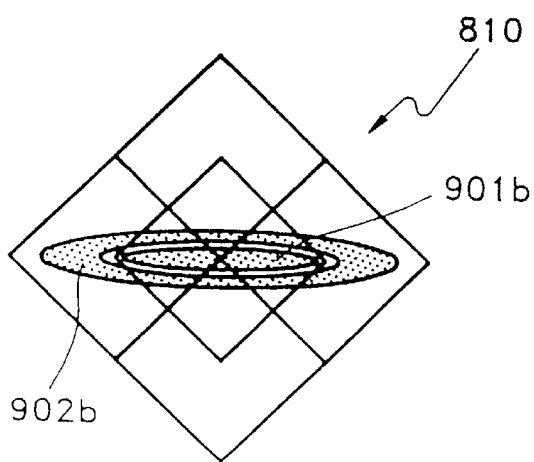
Figure 26:
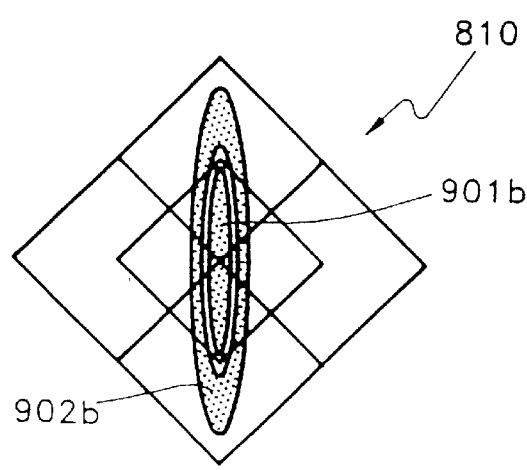
Figure 27:
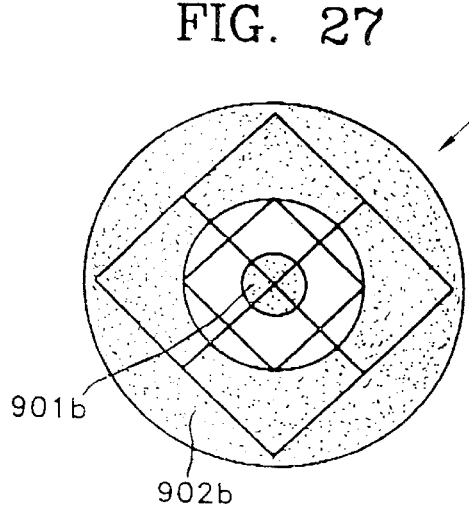
Figure 28:
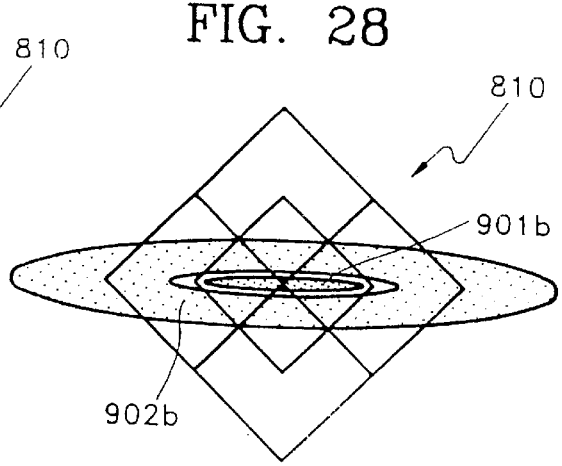
Figure 29:
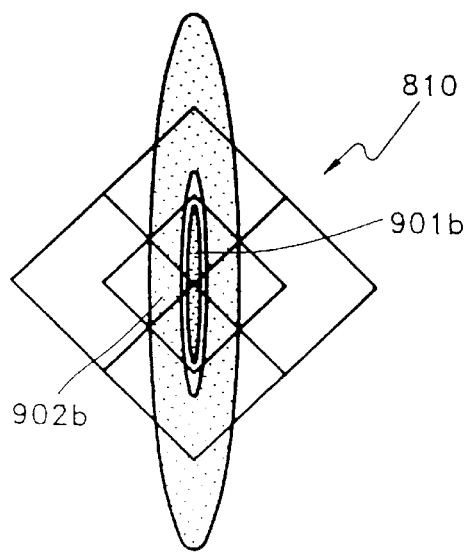

FIGS. 24–26 show the light-receiving states of the photodetector when a thin disc (digital video disc) is used. FIGS. 27–29 show the light-receiving states of the photodetector when a thick disc (compact disc) is used.

The first detection region 811 is devised such that, when information is read from a thick disc, the maximum quantity of the light is received from the near axis region but the minimum quantity of that is received from the far axis region. Particularly, when information is read from a thin disc, the first detection region 811 is devised such that the light beams 901b and 902b of the near-axis and far-axis regions are all received, as shown in FIG. 24. When information is read from a thick disc, the light beam 902b of the far-axis region reaches the second detection region 812, as shown in FIG. 27.

FIGS. 24, 25 and 26 show the light-receiving states when an objective lens is in focus with respect to a thin disc, when positioned too far from the disc and when positioned too near the disc, respectively. Similarly, FIGS. 27, 28 and 29 show the light-receiving states when an objective lens is in focus with respect to a thick disc, when positioned too far from the disc and when positioned too near the disc, respectively.

In the photodetector having the aforementioned structure, the entire signal, i.e., that from both the first and second detection regions, is used in reading information from a thin disc, and only the signal from the first detection region is used in reading information from a thick disc.

Figure 30:
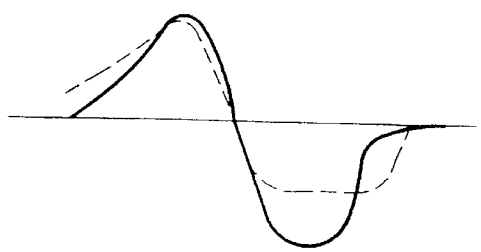
FIG. 30 is a focus signal curve obtained from the 8-segmented photodetector shown in FIG. 23.

FIG. 30 shows the focus signal changes by the signal from the first detection region and by the entire signal from the first and second detection regions.

As understood from the above, when information is read from a thick disc, the focus signal components are increased by using only the light of the near axis region, thereby obtaining a stable focus signal.

Figure 31:
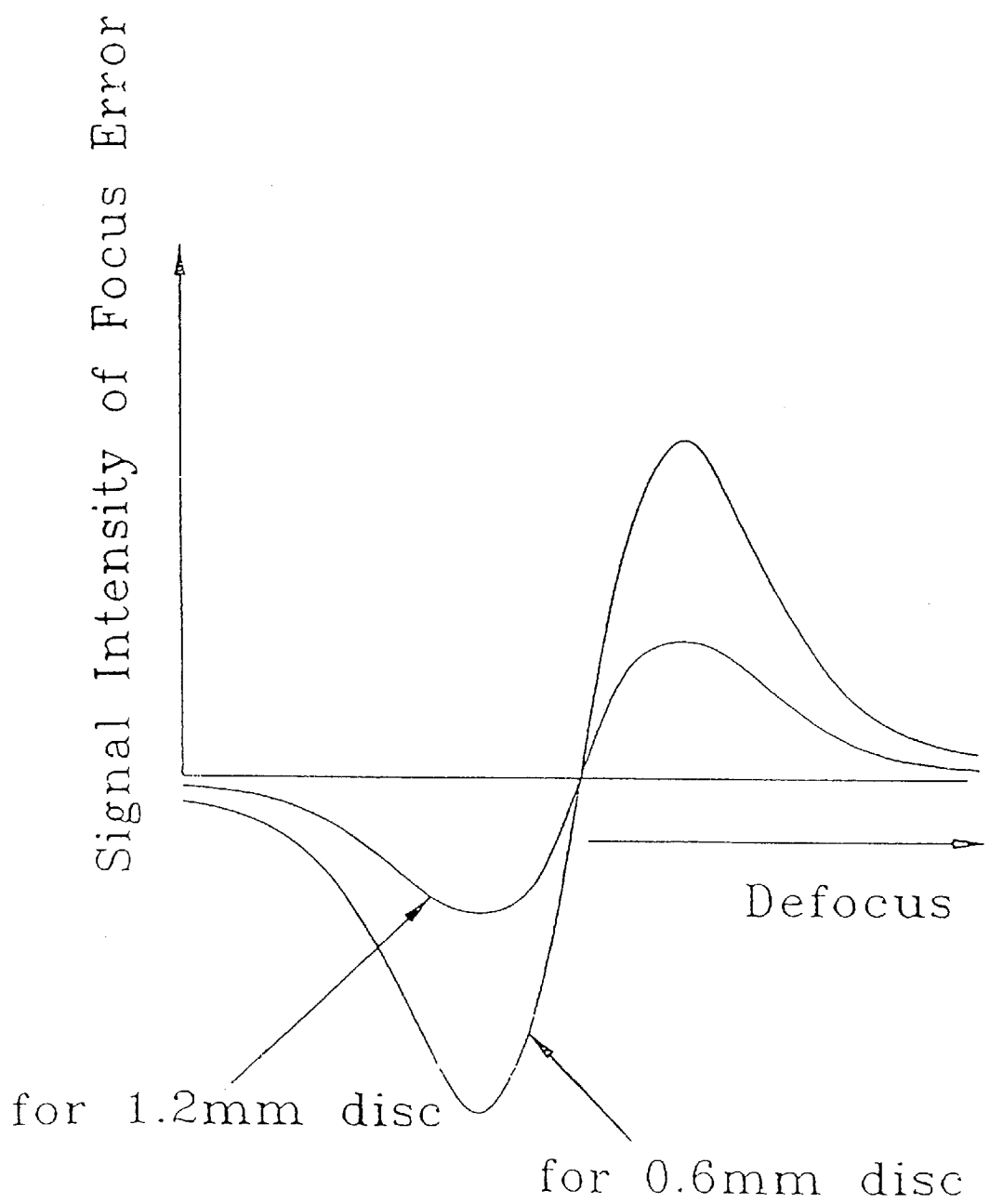
FIG. 31 is a graph for comparing the change of the focus signals detected by the photodetector in the optical pickup according to the present invention adopting two discs having different thicknesses.

Now, a focus controlling method of the objective lens device and optical pickup device adopting the same according to the present invention will be described, which has a size reducing effect of the light spot around the central portion, i.e., the light amount of the portion "B" of FIG. 5, and a focus signal stabilizing effect. Here, in the case of an astigmatic aberration method where the overall light receiving region of a photodetector is basically divided into four or eight parts, signals from diagonally disposed parts are summed, respectively, to obtain two sum signals and the difference between them. Since only a single focus control signal is generated, irrespective of a disc thickness, separate focus control signal means is not required. Also, in the case of adopting a thin disc, the magnitudes of the detected focus control signal are different depending on disc thickness. In other words, as shown in FIG. 31, all of the light of the near- and far-axis regions reach the photodetector in the case of a thin disc, and only the light of the near axis region reaches the photodetector in the case of a thick disc, thereby easily discriminating the disc type.

Figure 32:
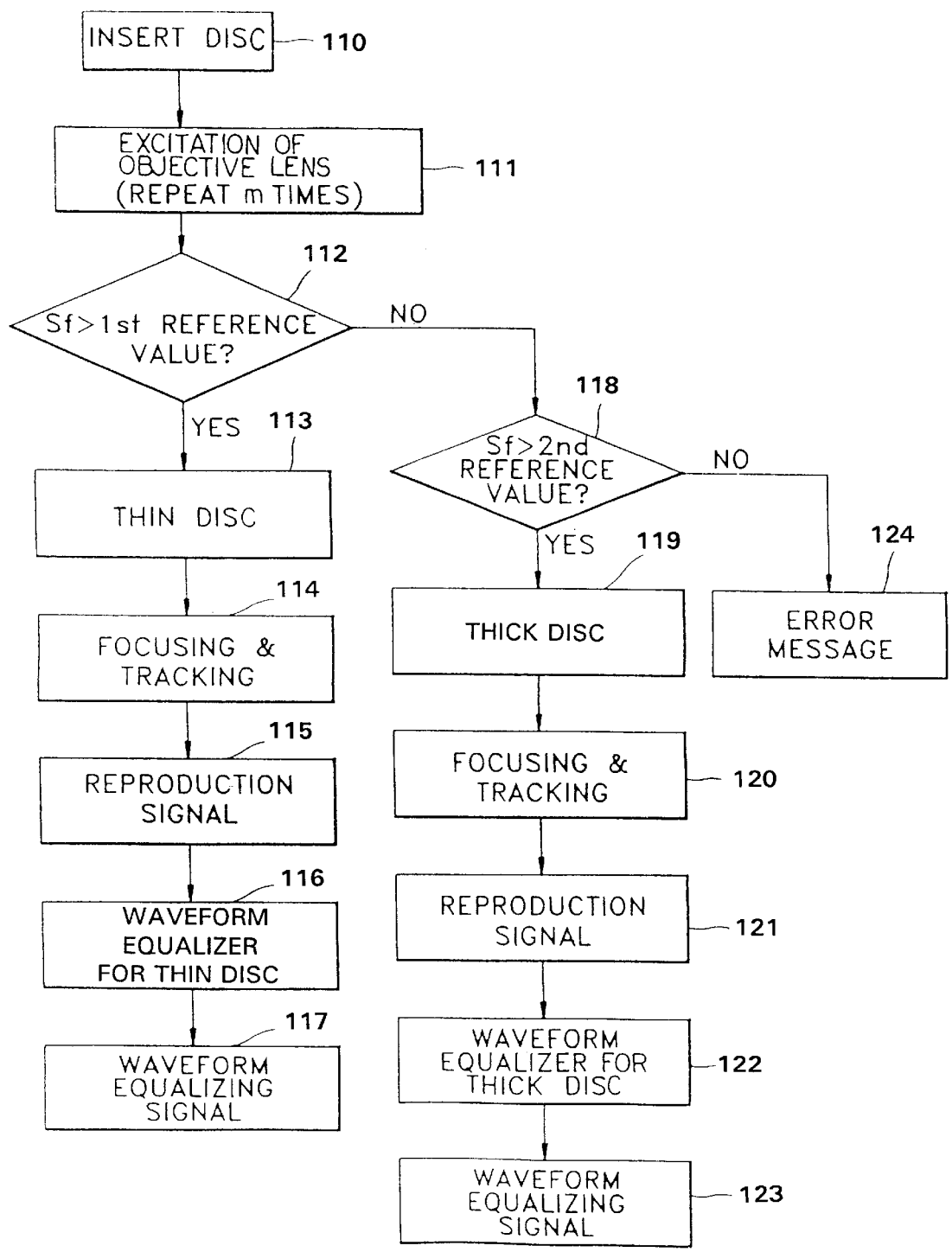
FIG. 32 is a flowchart showing the sequence of driving the optical pickup according to the present invention.

The operation of discriminating the disc type will now be described in detail with reference to FIG. 32.

Figure 33:
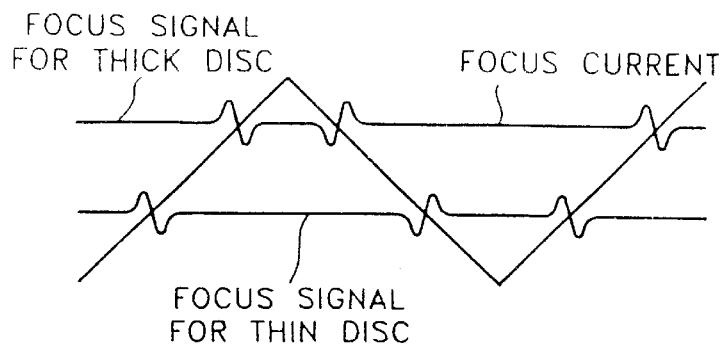
FIG. 33 shows the position where the focus signal is generated in a current-versus-time graph depending on the focus current variation, in the flowchart of FIG. 32.

If a thin disc (digital video disc) or thick disc (compact disc) is inserted into a disk drive in step 110, focus current is increased or decreased to discriminate the range of an objective lens, i.e., disc type, as shown in FIG. 33, so that the objective lens is moved m times within its range of focus moving direction in step 111, thereby obtaining a sum signal of signals from the photodetector and a focus signal ($S_f$). In step 112, the focus signal ($S_f$) is compared with a first reference value, and if the focus signal ($S_f$) is greater than the first reference value, a determination is made that the disk is a thin disc.

In step 114, focusing and tracking are continuously performed, and in step 115, a reproduction signal is generated from the light reflected from the disc. The reproduction signal passes through a waveform equalizer for a thin disc (digital video disc) in step 116 to obtain a waveform equalizing signal in step 117.

However, if the first reference value is at least as great as the focus signal $S_f$, it is determined whether the focus signal $S_f$ is greater than a second reference value corresponding to the thick disc (compact disc) in step 118. If the focus signal $S_f$ is greater than the second reference value, it is determined that the disc is thick in step 119, and focusing and tracking are continuously performed in step 120, thereby obtaining a reproduction signal in step 121. The reproduction signal passes through a waveform equalizer for a thick disc (compact disc) in step 122 to obtain a waveform equalizing signal in step 123.

If the focus signal $S_f$ not greater than the second reference signal, an error signal is generated in step 124.

As described above, compared with the conventional objective lens device, the objective lens device according to the present invention has various advantages as follows.

In that case, since a 4-segmented photodetector is used, the focus signal is obtained by an astigmatic method. It was experimentally determined that the light amount sufficient enough for the compatibility for both disc types could be obtained and a focus signal stabilization could be realized, under the condition that the amplitude of the focus signal for a thin disc reproduction is four times that for a thick disc reproduction.

The amount of spherical aberration is reduced by the above-described method to reproduce a signal recorded onto a disc. In such a case, however, the spherical aberration is larger than that of the optical pickup for a conventional compact disc player, thereby resulting in the deterioration of a reproduction signal. Therefore, it is preferable that a conventional digital waveform equalizer shown in FIG. 36 is employed.

Figure 36:
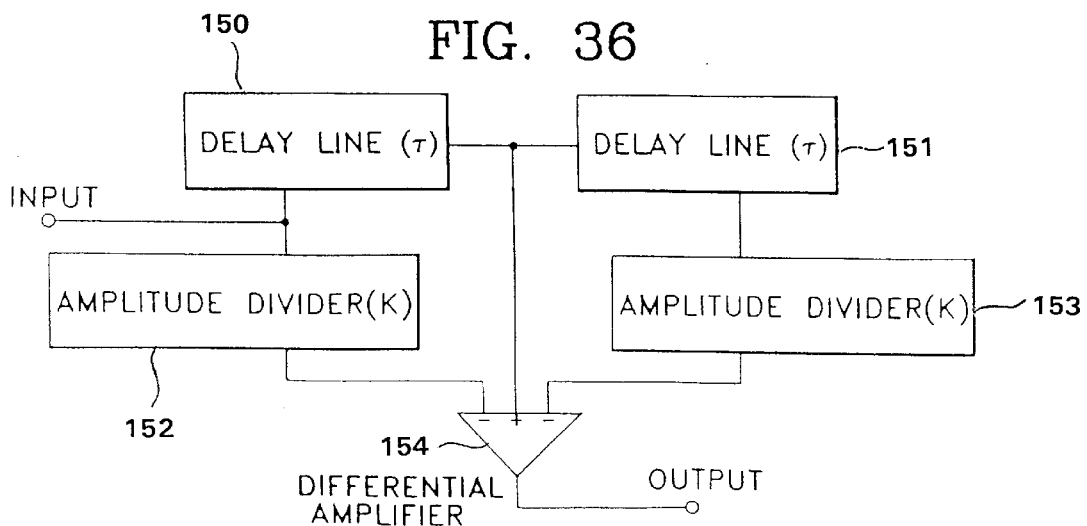
FIG. 36 is a block diagram of a digital equalizer used in the optical pickup according to the present invention.
Figure 37A:
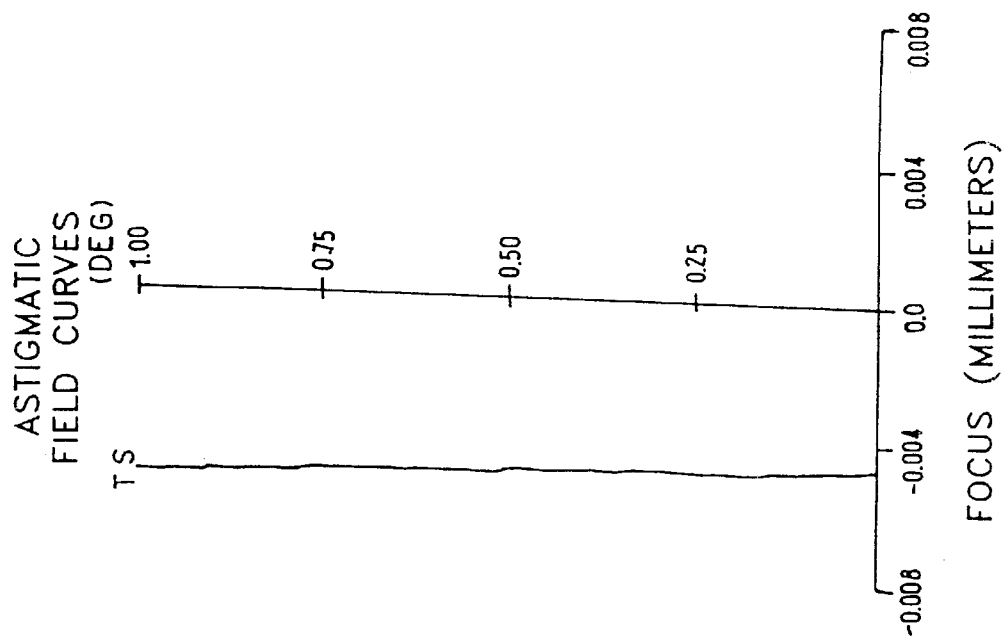
FIGS. 37A and 37B are graphs showing a field aberration in a digital video disc and in a compact disc, respectively, by the optical pickup according to the present invention.
Figure 37B:
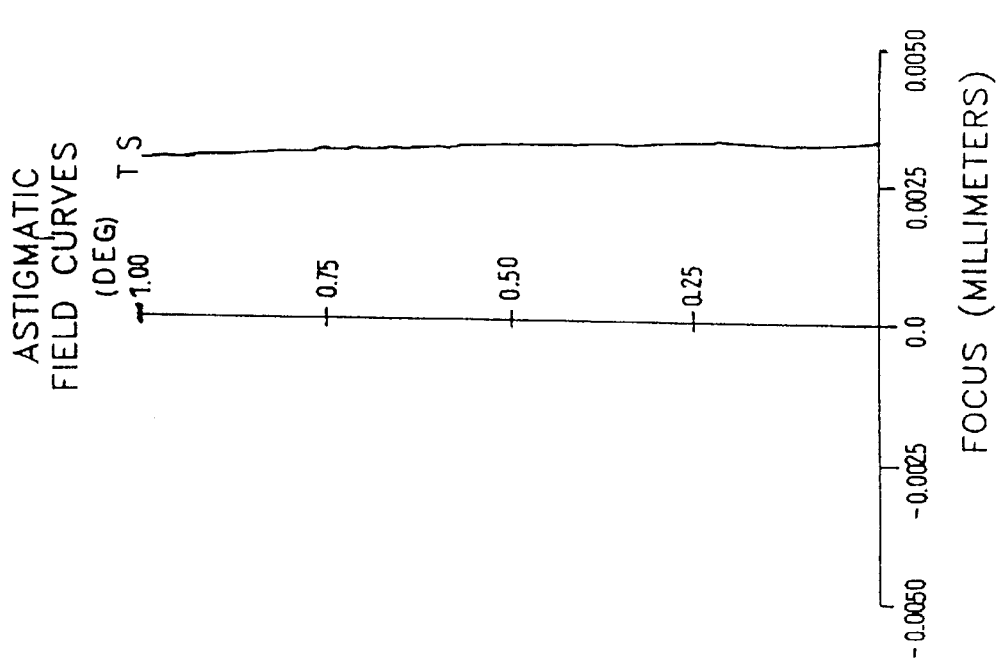
Figure 38A:
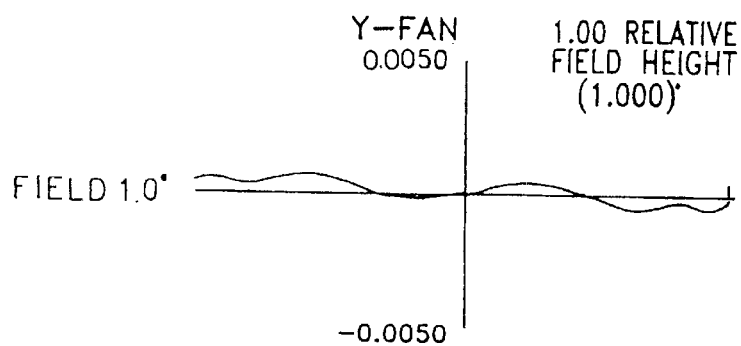
FIGS. 38A and 38B, 39A and 39B, and 40A and 40B each are graphs showing ray aberration depending on the field angle in the digital video disc by the optical pickup according to the present invention.
Figure 38B:
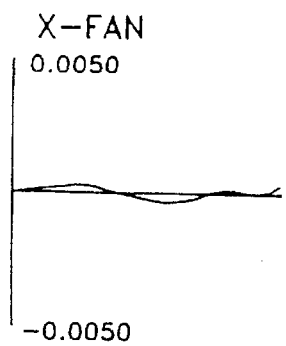
Figure 39A:
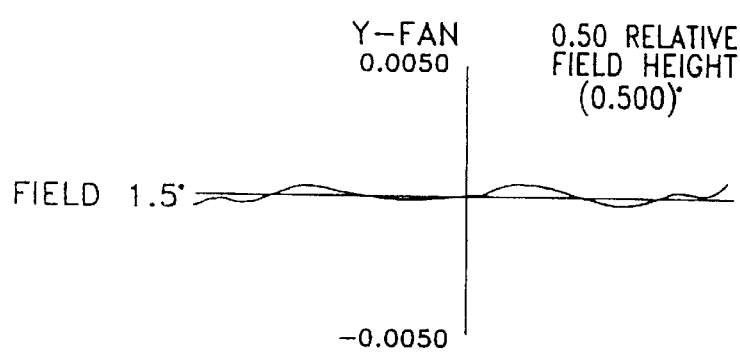
Figure 39B:
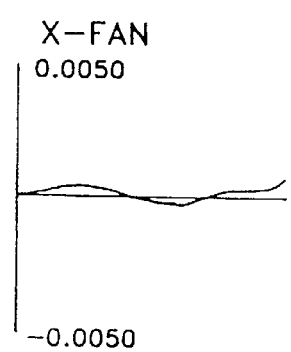
Figure 40A:
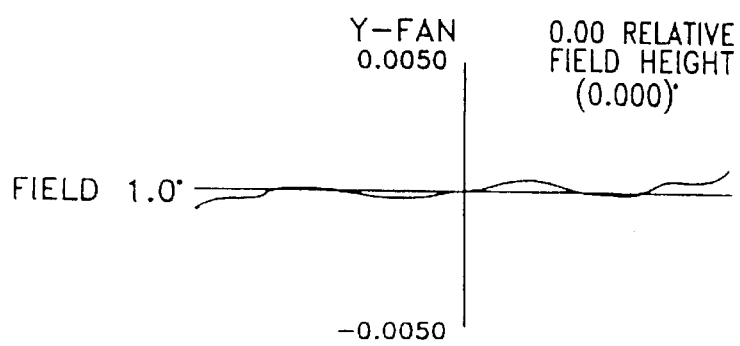
Figure 40B:
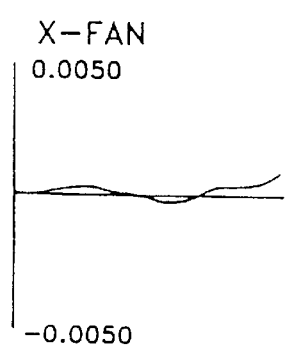
Figure 41A:
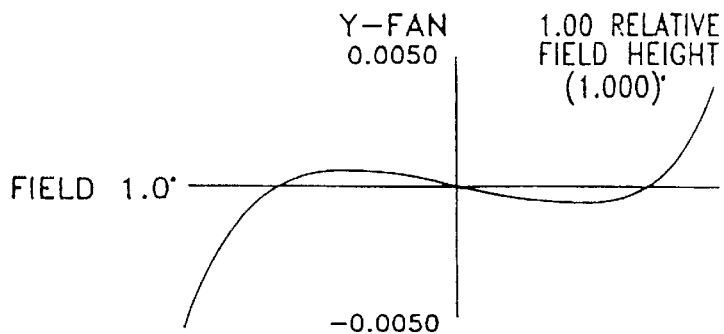
FIGS. 41A and 41B, 42A and 42B, and 43A and 43B each are graphs showing ray aberration depending on the field angle in the compact disc by the optical pickup according to the present invention.
Figure 41B:
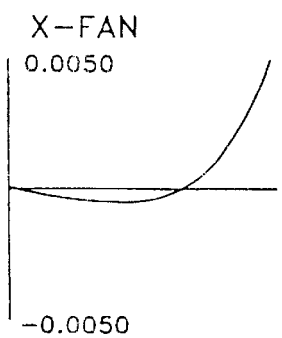
Figure 42A:
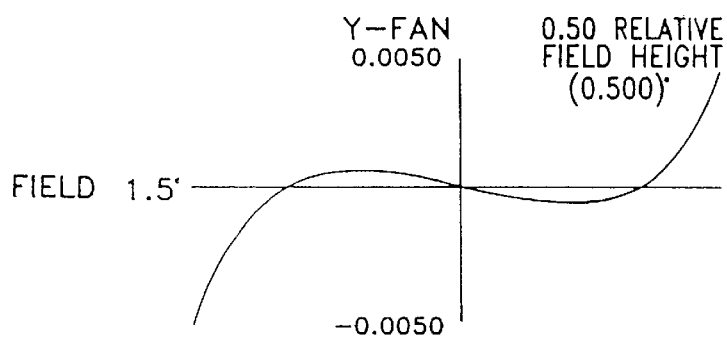
Figure 42B:
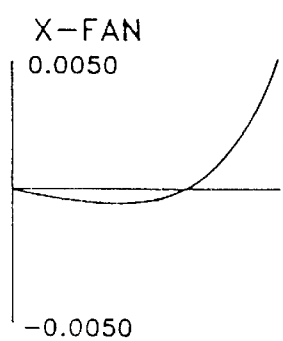
Figure 43A:
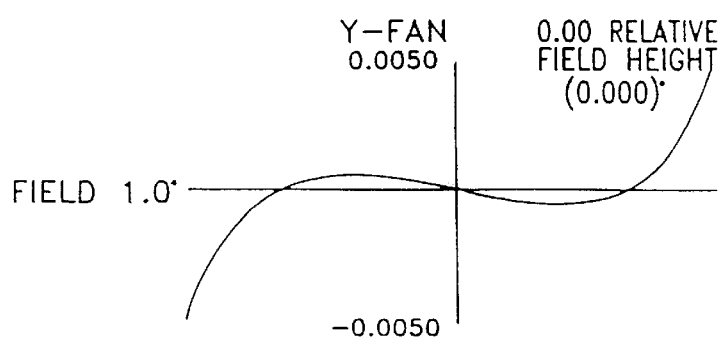
Figure 43B:
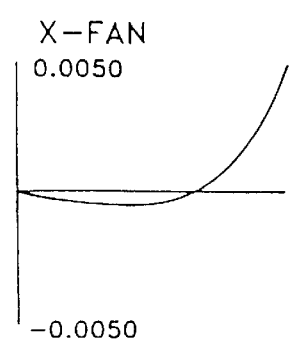

In FIG. 36, the reproduction signal is received by an amplitude divider (K) 152 and delay line ($\tau$) 150. The output from the delay line ($\tau$) is received by a delay line ($\tau$) 151 which is then output to an amplitude divider (K) 153. The outputs from the amplitude divider (K) 152, delay line ($\tau$) and amplitude divider (K) 153 are input to a differential amplifier 154.

If the focus signal $S_f$ and the sum signal are obtained, it is determined whether the focus signal $S_f$ is greater than a first reference signal for a thin disc. In that case, the sum signal may also be compared with the first reference signal in accordance with the design conditions.

Figure 34:
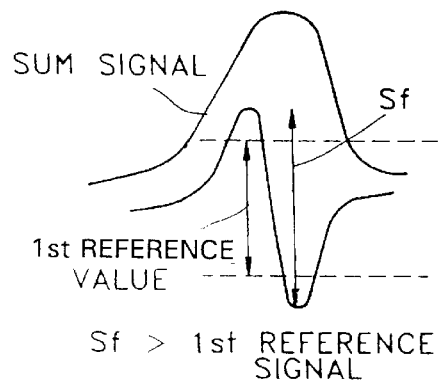
FIGS. 34 and 35 are current-versus-time graphs comparing the focus signal with the first and second reference values used in the flowchart of FIG. 28, respectively.

As shown in FIG. 34, if the first reference value is less than the focus signal $S_f$ or the sum signal, it is determined that the disc is thin and focusing and tracking are continuously performed, thereby obtaining a reproduction signal. The reproduction signal passes through a waveform equalizer for a thin disc (digital video disc) to obtain a waveform equalizing signal.

However, if the first reference value is at least as great as the focus signal $S_f$ or the sum signal, it is determined whether the focus signal $S_f$ is greater than the second reference value corresponding to the thick disc (compact disc).

Figure 35:
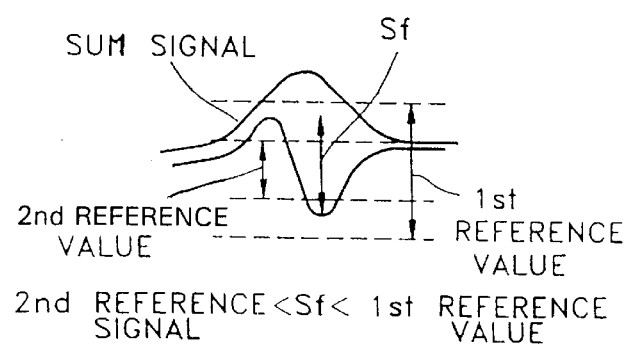

As shown in FIG. 35, if the focus signal $S_f$ or the sum signal is greater than the second reference value, it is determined that the disc is thick and focusing and tracking are continuously performed, thereby obtaining a reproduction signal. The reproduction signal passes through a waveform equalizer for a thick disc (compact disc) to obtain a waveform equalizing signal.

If the focus signal $S_f$ or the sum signal is less than or equal to a second reference signal, an error signal is generated.

As described above, compared with the conventional objective lens device, the objective lens device according to the present invention has various advantages as follows.

The objective lens device according to the present invention adopts light blocking or scattering means which is simple and easy to fabricate, e.g., a light controlling film formed on a transparent member or a light blocking or scattering groove formed on the objective lens, whereas the conventional objective lens device adopts a complex and expensive hologram lens. Also, since the light is used without being separated by a hologram lens, the objective lens device according to the present invention has an improved higher light utilization efficiency. In addition, since the objective lens device with light controlling means has a single objective lens, it is very simple to assemble and adjust the optical pickup adopting the lens device. Also, since a signal which can discriminate the disc type is obtained, a separate element is not required for discriminating the disc type.

What is claimed is:

1. An objective lens device to radiate an incident light beam onto a disc placed in a disc drive, comprising:

an objective lens, having a central portion and a peripheral portion, provided along a light path of said incident light beam, facing a plane of the disc and having a predetermined effective diameter; and light controlling means provided along the light path of said incident light beam for controlling the light between near and far axis regions of said incident light beam so as not to be focused on the disc, wherein the central portion of said objective lens, which corresponds to the near axis region of said incident light beam, has an optimum curvature and an aspherical coefficient so as to focus the light of the near axis region on the disc both if the disc has a first thickness and if the disc has a second thickness greater than the first thickness.

2. An objective lens device as claimed in claim 1, wherein the peripheral portion of said objective lens, which corresponds to the far axis region of said incident light beam has the optimum curvature and aspherical coefficient for the disc if the disc has the first thickness.

3. An objective lens device as claimed in claim 2, wherein said light controlling means controls the light of a predetermined region having an outer diameter smaller than the effective diameter of said objective lens.

4. An objective lens device as claimed in claim 3, wherein said light controlling means is a transparent member having a light controlling film of a predetermined pattern.

5. An objective lens device as claimed in claim 2, wherein said light controlling means is a transparent member having a light controlling film of a predetermined pattern.

6. An objective lens device as claimed in claim 5, wherein said transparent member is spaced apart from said objective lens by a predetermined distance.

7. An objective lens device as claimed in claim 6, wherein said objective lens is a plane lens.

8. An objective lens device as claimed in claim 2, wherein said light controlling means is a light controlling film of a predetermined pattern formed on at least one surface of said objective lens.

9. An objective lens device as claimed in claim 2, wherein said light controlling means is a light controlling pattern of a predetermined shape, formed on at least one surface of said objective lens for controlling said incident light beam.

10. An objective lens device as claimed in claim 9, wherein said light controlling pattern is a groove having a plane of a predetermined slope with respect to a light traveling axis of said objective lens.

11. An objective lens device as claimed in claim 10, wherein said light controlling pattern has a V-shaped cross-section.

12. An objective lens device as claimed in claim 9, wherein said light controlling pattern is a protruding step in shape.

13. An objective lens device as claimed in claim 9, wherein said objective lens is a plane lens.

14. An objective lens device as claimed in claim 9, wherein said light controlling means has a diffraction lattice for controlling said incident light beam.

15. An objective lens device as claimed in claim 9, wherein said light controlling means has a light scattering pattern with an irregular plane.

16. An objective lens device as claimed in claim 1, wherein said light controlling means controls the light of a predetermined region having an outer diameter smaller than the effective diameter of said objective lens.

17. An objective lens device as claimed in claim 16, wherein said light controlling means is a transparent member having a light controlling film of a predetermined pattern.

18. An objective lens device as claimed in claim 1, wherein said light controlling means is a transparent member having a light controlling film of a predetermined pattern.

19. An objective lens device as claimed in claim 18, wherein said transparent member is spaced apart from said objective lens by a predetermined distance.

20. An objective lens device as claimed in claim 19, wherein said objective lens is a plane lens.

21. An objective lens device as claimed in claim 1, wherein said light controlling means is a light controlling film of a predetermined pattern formed on at least one surface of said objective lens.

22. An objective lens device as claimed in claim 1, wherein said light controlling means is a light controlling pattern of a predetermined shape, formed on at least one surface of said objective lens for controlling said incident light beam.

23. An objective lens device as claimed in claim 22, wherein said light controlling pattern is a groove having a plane of a predetermined slope with respect to a light traveling axis of said objective lens.

24. An objective lens device as claimed in claim 23, wherein said light controlling pattern has a V-shaped cross-section.

25. An objective lens device as claimed in claim 22, wherein said light controlling pattern is a protruding step in shape.

26. An objective lens device as claimed in claim 22, wherein said objective lens is a plane lens.

27. An objective lens device as claimed in claim 22, wherein said light controlling means has a diffraction lattice for controlling said incident light beam.

28. An objective lens device as claimed in claim 22, wherein said light controlling means has a light scattering pattern with an irregular plane.

29. An objective lens device as claimed in claim 1, wherein said light controlling means has a perimetrical shape.

30. An objective lens device as claimed in claim 1, wherein said light controlling means is a transparent member having a perimetrical shape.

31. An optical pickup device as claimed in claim 1, wherein said light controlling means is a light controlling groove having a perimetrical shape, formed on at least one surface of said objective lens for controlling said incident light beam.

32. An optical pickup device to radiate an incident light beam onto a disc placed in a disk drive, comprising:

a light source to generate said incident light beam;

an objective lens having a central portion, an intermediate portion, and a peripheral portion, provided along a light path from said light source, facing a plane of the disc and having a predetermined effective diameter;

light controlling means provided along the light path and facing said objective lens, for controlling the light of the intermediate region between near- and far-axis regions of said incident light beam not to be focused in said disc;

a beam splitter provided between said light controlling means and said light source; and a photodetector for detecting the light reflected from the disc and split by said beam splitter, wherein the central portion of said objective lens corresponding to the near-axis region of said incident light beam has an optimum curvature and aspherical coefficient so as to focus the light of the near-axis region on the disc both if the disc has a first thickness and if the disc has a second thickness greater than the first thickness.

33. An optical pickup device as claimed in claim 32, wherein the peripheral portion of said objective lens, which corresponds to the far-axis region of said incident light beam, has the optimum curvature and aspherical coefficient so as to focus the light of the far-axis region on the disc if the disc has the first thickness.

34. An optical pickup device as claimed in claim 33, wherein said light controlling means controls the light of a predetermined region having an outer diameter smaller than the effective diameter of said objective lens.

35. An optical pickup device as claimed in claim 33, wherein said light controlling means is a transparent member having a light controlling film of a predetermined pattern.

36. An optical pickup device as claimed in claim 35, wherein said transparent member is spaced apart from said objective lens by a predetermined distance.

37. An optical pickup device as claimed in claim 33, wherein said light controlling means is a light controlling film of a predetermined pattern formed on at least one surface of said objective lens.

38. An optical pickup device as claimed in claim 37, wherein said objective lens is a plane lens.

39. An optical pickup device as claimed in claim 33, wherein said light controlling means is a light controlling pattern of a predetermined shape, formed on at least one surface of said objective lens for controlling said incident light beam.

40. An optical pickup device as claimed in claim 39, wherein said objective lens is a plane lens.

41. An optical pickup lens device as claimed in claim 39, wherein said light controlling pattern is a groove having a plane of a predetermined slope with respect to a light traveling axis of said objective lens.

42. An optical pickup device as claimed in claim 41, wherein said light controlling pattern has a V-shaped cross-section.

43. An optical pickup device as claimed in claim 39, wherein said light controlling pattern has a diffraction lattice pattern for controlling said incident light beam.

44. An optical pickup device as claimed in claim 39, wherein said light controlling means has a light scattering pattern with an irregular plane.

45. An optical pickup device as claimed in claim 39, wherein said light controlling pattern is a protruding step or wedge in shape.

46. An optical pickup device as claimed in claim 33, wherein said objective lens is a plane lens.

47. An optical pickup device as claimed in claim 33, wherein said photodetector receives the light beam of the near-axis region among the light beams reflected from the disc if the disc has the second thickness and receives all the light beams of the near- and far-axis regions among the light beams reflected from the disc if the disc has the second thickness.

48. An optical pickup device as claimed in claim 47, wherein said light controlling means, which is annular, blocks or scatters the light of the intermediate region and has an outer diameter smaller than the effective diameter of said objective lens.

49. An optical pickup device as claimed in claim 48, wherein said light controlling means is a transparent member having a light controlling film of a predetermined pattern.

50. An optical pickup device as claimed in claim 49, wherein said transparent member is spaced apart from said objective lens by a predetermined distance.

51. An optical pickup device as claimed in claims 49, wherein said light controlling means is a light controlling groove of a predetermined pattern, formed on at least one surface of said objective lens for controlling said incident light beam.

52. An optical pickup device as claimed in claim 51, wherein said objective lens is a plane lens.

53. An optical pickup device as claimed in claim 51, wherein said light controlling pattern has a diffraction lattice pattern for controlling said incident light beam.

54. An optical pickup device as claimed in claim 51, wherein said light controlling means has a light scattering pattern with an irregular plane.

55. An optical pickup device as claimed in claim 48, wherein said light controlling means is a light controlling film of a predetermined pattern formed on at least one surface of said objective lens.

56. An optical pickup device as claimed in claim 55, wherein said objective lens is a plane lens.

57. An optical pickup device as claimed in claim 48, wherein said light controlling means is a light controlling groove of a predetermined pattern, formed on at least one surface of said objective lens for controlling said incident light beam.

58. An optical pickup device as claimed in claim 57, wherein said objective lens is a plane lens.

59. An optical pickup device as claimed in claim 57, wherein said light controlling pattern has a diffraction lattice pattern for controlling said incident light beam.

60. An optical pickup device as claimed in claim 57, wherein said light controlling means has a light scattering pattern with an irregular plane.

61. An optical pickup device as claimed in claim 47, wherein said light controlling means is a light controlling film of a predetermined pattern formed on at least one surface of said objective lens.

62. An optical pickup device as claimed in claim 61, wherein said objective lens is a plane lens.

63. An optical pickup device as claimed in claim 32, wherein said light controlling means controls the light of a predetermined region having an outer diameter smaller than the effective diameter of said objective lens.

64. An optical pickup device as claimed in claim 32, wherein said light controlling means is a transparent member having a light controlling film of a predetermined pattern.

65. An optical pickup device as claimed in claim 64, wherein said transparent member is spaced apart from said objective lens by a predetermined distance.

66. An optical pickup device as claimed in claim 32, wherein said light controlling means is a light controlling film of a predetermined pattern formed on at least one surface of said objective lens.

67. An optical pickup device as claimed in claim 66, wherein said objective lens is a plane lens.

68. An optical pickup device as claimed in claim 32, wherein said light controlling means is a light controlling pattern of a predetermined shape, formed on at least one surface of said objective lens for controlling said incident light beam.

69. An optical pickup device as claimed in claim 68, wherein said objective lens is a plane lens.

70. An optical pickup lens device as claimed in claim 68, wherein said light controlling pattern is a groove having a plane of a predetermined slope with respect to a light traveling axis of said objective lens.

71. An optical pickup device as claimed in claim 70, wherein said light controlling pattern has a V-shaped cross-section.

72. An optical pickup device as claimed in claim 68, wherein said light controlling pattern has a diffraction lattice pattern for controlling said incident light beam.

73. An optical pickup device as claimed in claim 68, wherein said light controlling means has a light scattering pattern with an irregular plane.

74. An optical pickup device as claimed in claim 68, wherein said light controlling pattern is a protruding step or wedge in shape.

75. An optical pickup device as claimed in claim 32, wherein said objective lens is a plane lens.

76. An optical pickup device as claimed in claim 32, wherein said photodetector receives the light beam of the near-axis region among the light beams reflected from the disc if the disc has the second thickness and receives all the light beams of the near- and far-axis regions among the light beams reflected from the disc if the disc has the first thickness.

77. An optical pickup device as claimed in claim 76, wherein said light controlling means, which is annular, blocks or scatters the light of the intermediate region and has an outer diameter smaller than the effective diameter of said objective lens.

78. An optical pickup device as claimed in claim 77, wherein said light controlling means is a transparent member having a light controlling film of a predetermined pattern.

79. An optical pickup device as claimed in claim 78, wherein said transparent member is spaced apart from said objective lens by a predetermined distance.

80. An optical pickup device as claimed in claim 78, wherein said light controlling means is a light controlling groove of a predetermined pattern, formed on at least one surface of said objective lens for controlling said incident light beam.

81. An optical pickup device as claimed in claim 80, wherein said objective lens is a plane lens.

82. An optical pickup device as claimed in claim 80, wherein said light controlling pattern has a diffraction lattice pattern for controlling said incident light beam.

83. An optical pickup device as claimed in claim 80, wherein said light controlling means has a light scattering pattern with an irregular plane.

84. An optical pickup device as claimed in claim 77, wherein said light controlling means is a light controlling film of a predetermined pattern formed on at least one surface of said objective lens.

85. An optical pickup device as claimed in claim 84, wherein said objective lens is a plane lens.

86. An optical pickup device as claimed in claim 77, wherein said light controlling means is a light controlling groove of a predetermined pattern, formed on at least one surface of said objective lens for controlling said incident light beam.

87. An optical pickup device as claimed in claim 86, wherein said objective lens is a plane lens.

88. An optical pickup device as claimed in claim 86, wherein said light controlling pattern has a diffraction lattice pattern for controlling said incident light beam.

89. An optical pickup device as claimed in claim 86, wherein said light controlling means has a light scattering pattern with an irregular plane.

90. An optical pickup device as claimed in claim 76, wherein said light controlling means is a light controlling film of a predetermined pattern formed on at least one surface of said objective lens.

91. An optical pickup device as claimed in claim 90, wherein said objective lens is a plane lens.

92. An optical pickup device as claimed in claim 32, wherein said photodetector includes:
   a first light receiving region for receiving the light beam of the near-axis region among the light beams reflected from the disc if the disc has the second thickness, and receiving all the light beams of the near- and far-axis regions among the light beams reflected from the disc if the disc has the first thickness and
   a second light receiving region for surrounding said first light receiving region.

93. An optical pickup device as claimed in claim 92, wherein said first and second light receiving regions of said photodetector are 4-segmented and form a square arrangement.

94. An optical pickup device as claimed in claim 93, wherein said light controlling means blocks or scatter the light of a predetermined region having an outer diameter smaller than the effective diameter of said objective lens.

95. An optical pickup device as claimed in claim 94, wherein said light controlling means is a transparent member having a light controlling film of a predetermined pattern.

96. An optical pickup device as claimed in claim 95, wherein said transparent member is spaced apart from said objective lens by a predetermined distance.

97. An optical pickup device as claimed in claim 94, wherein said light controlling means is a light controlling film of a predetermined pattern formed on at least one surface of said objective lens.

98. An optical pickup device as claimed in claim 97, wherein said objective lens is a plane lens.

99. An optical pickup device as claimed in claim 94, wherein said light controlling means is a light controlling pattern of a predetermined shape, formed on at least one surface of said objective lens for controlling said incident light beam.

100. An optical pickup device as claimed in claim 99, wherein said objective lens is a plane lens.

101. An optical pickup device as claimed in claim 100, wherein said light controlling pattern is a groove having a plane of a predetermined slope with respect to a light traveling axis of said objective lens.

102. An optical pickup device as claimed in claim 101, wherein said light controlling pattern has a V-shaped cross-section.

103. An optical pickup device as claimed in claim 99, wherein said light controlling pattern has a diffraction lattice pattern for controlling said incident light beam.

104. An optical pickup device as claimed in claim 99, wherein said light controlling means has a light scattering pattern with an irregular plane.

105. An optical pickup device as claimed in claim 99, wherein said light controlling pattern is a protruding step or wedge in shape.

106. An optical pickup device as claimed in claim 93, wherein said light controlling means is a transparent member having a light controlling film of a predetermined pattern.

107. An optical pickup device as claimed in claim 106, wherein said transparent member is spaced apart from said objective lens by a predetermined distance.

108. An optical pickup device as claimed in claim 92, wherein said light controlling means blocks or scatter the light of a predetermined region having an outer diameter smaller than the effective diameter of said objective lens.

109. An optical pickup device as claimed in claim 108, wherein said light controlling means is a transparent member having a light controlling film of a predetermined pattern.

110. An optical pickup device as claimed in claim 109, wherein said transparent member is spaced apart from said objective lens by a predetermined distance.

111. An optical pickup device as claimed in claim 92, wherein said light controlling means is a transparent member having a light controlling film of a predetermined pattern.

112. An optical pickup device as claimed in claim 111, wherein said transparent member is spaced apart from said objective lens by a predetermined distance.

113. An optical pickup device as claimed in claim 92, wherein said light controlling means is a light controlling film of a predetermined pattern formed on at least one surface of said objective lens.

114. An optical pickup device as claimed in claim 113, wherein said objective lens is a plane lens.

115. An optical pickup device as claimed in claim 92, wherein said light controlling means is a light controlling pattern of a predetermined shape, formed on at least one surface of said objective lens for controlling said incident light beam.

116. An optical pickup device as claimed in claim 115, wherein said objective lens is a plane lens.

117. An optical pickup device as claimed in claim 116, wherein said light controlling pattern is a groove having a plane of a predetermined slope with respect to a light traveling axis of said objective lens.

118. An optical pickup device as claimed in claim 117, wherein said light controlling pattern has a V-shaped cross-section.

119. An optical pickup device as claimed in claim 115, wherein said light controlling pattern has a diffraction lattice pattern for controlling said incident light beam.

120. An optical pickup device as claimed in claim 115, wherein said light controlling means has a light scattering pattern with an irregular plane.

121. An optical pickup device as claimed in claim 115, wherein said light controlling pattern is a protruding step or wedge in shape.

122. An optical pickup device as claimed in claim 92, wherein:
said first light receiving region has four segments in a central region and symmetrically formed about two perpendicular axes; and
said second light receiving portion has four segments in a peripheral region, surrounding the four segments of the central region and symmetrically formed about the two perpendicular axes.

* * * * *